(12) United States Patent
Kim et al.

(10) Patent No.: US 9,702,616 B2
(45) Date of Patent: Jul. 11, 2017

(54) APPARATUS FOR PRODUCING CARBONATED WATER, AND REFRIGERATOR INCLUDING THE SAME AND METHOD FOR CONTROLLING THE SAME

(71) Applicant: LG ELECTRONICS INC., Seoul (KR)

(72) Inventors: Yonghyun Kim, Seoul (KR); Jimin You, Seoul (KR); Siyeon An, Seoul (KR); Sungkyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 14/788,959

(22) Filed: Jul. 1, 2015

(65) Prior Publication Data
US 2016/0003523 A1    Jan. 7, 2016

(30) Foreign Application Priority Data

Jul. 4, 2014 (KR) .................. 10-2014-0084012
Jul. 4, 2014 (KR) .................. 10-2014-0084014

(51) Int. Cl.
*B01F 3/04* (2006.01)
*A23L 2/00* (2006.01)
(Continued)

(52) U.S. Cl.
CPC .............. *F25D 23/126* (2013.01); *A23L 2/54* (2013.01); *B01F 3/04106* (2013.01);
(Continued)

(58) Field of Classification Search
CPC .... B01F 3/04; B01F 3/04099; B01F 3/04106; B01F 3/04787; B01F 3/04815; A23L 2/00; A23L 2/54
(Continued)

(56) References Cited

U.S. PATENT DOCUMENTS 4,562,013 A    12/1985 Jeans
4,882,097 A    11/1989 Shannon
(Continued)

FOREIGN PATENT DOCUMENTS

EP    1579905    9/2005
EP    1579906    9/2005
(Continued)

OTHER PUBLICATIONS

Extended European Search Report issued in European Application No. 15174498.4 on Nov. 17, 2015, 6 pages.
Extended European Search Report issued in European Application No. 16174608.6 on Nov. 17, 2016, 8 pages.

*Primary Examiner* — Robert A Hopkins
(74) *Attorney, Agent, or Firm* — Fish & Richardson P.C.

(57) ABSTRACT

An apparatus for producing carbonated water includes a gas cylinder configured to store carbon dioxide gas, a cold water storage unit configured to store cold water, a producing tank defining a closed space where the carbonated water is produced, a water supply passage configured to connect the cold water storage unit to the producing tank, the water supply passage including a water supply valve that controls supply of the cold water, a gas supply passage connecting the gas cylinder to the producing tank, the gas supply passage including a gas valve that controls supply of the carbon dioxide, a first relief valve provided along the gas supply passage, the first relief valve configured to control the discharge of the carbon dioxide gas, a dispensing passage connecting the producing tank to a dispensing member, and the dispensing member configured to dispense the carbonated water from a front surface of a refrigerator.

33 Claims, 20 Drawing Sheets

(51) Int. Cl.
*F25D 23/12* (2006.01)
*B67D 1/00* (2006.01)
*A23L 2/54* (2006.01)
*B01F 15/00* (2006.01)

(52) U.S. Cl.
CPC ...... *B01F 3/04262* (2013.01); *B01F 3/04787* (2013.01); *B01F 3/04808* (2013.01); *B01F 3/04815* (2013.01); *B01F 15/00155* (2013.01); *B01F 15/00415* (2013.01); *B67D 1/0014* (2013.01); *B67D 1/0071* (2013.01); *B01F 2003/04319* (2013.01); *B01F 2003/04822* (2013.01)

(58) Field of Classification Search
USPC .................. 261/26, 121.1, DIG. 7; 99/323.1; 426/477
See application file for complete search history.

(56) References Cited

U.S. PATENT DOCUMENTS

| | | | |
|---|---|---|---|
| 5,124,088 A | 6/1992 | Stumphauzer | |
| 8,905,383 B2 * | 12/2014 | Ko | ........................ F25D 23/126 261/119.1 |
| 2012/0038068 A1 | 2/2012 | Bormes et al. | |

FOREIGN PATENT DOCUMENTS

| | | |
|---|---|---|
| JP | 2000-348250 A | 12/2000 |
| JP | 2004-216320 A | 8/2004 |
| KR | 10-2005-0087536 A | 8/2005 |
| KR | 10-2008-0015739 | 2/2008 |
| KR | 10-2013-0128524 A | 11/2013 |

* cited by examiner

APPARATUS FOR PRODUCING CARBONATED WATER, AND REFRIGERATOR INCLUDING THE SAME AND METHOD FOR CONTROLLING THE SAME

CROSS-REFERENCE TO RELATED APPLICATIONS

The application claims priority under 35 U.S.C. 119 and 35 U.S.C. 365 to Korean Patent Application No. 10-2014-0084012 and 10-2014-0084014 both filed Jul. 4, 2014, whose entire disclosure is hereby incorporated by reference.

FIELD

The present disclosure relates to an apparatus for producing carbonated water, and a refrigerator including the same and a method for controlling the same.

BACKGROUND

Refrigerators are home appliances that can store foods at low temperatures in an inner storing space covered by a refrigerator door. Typically, the storing space is cooled using cool air that is generated by heat-exchanging with a refrigerant circulated in a refrigeration cycle to store the foods in an optimal state.

In recent years, refrigerators have increased more and more in size to and provide multi-functions, and accordingly, refrigerators of various structures in consideration of user convenience have been brought to the market.

In some cases, a refrigerator may include a dispenser for dispensing water or ice in a state where the refrigerator door is in a closed position, and carbonated water is dispensed through the dispenser.

SUMMARY

According to one aspect, an apparatus for producing carbonated water includes a gas cylinder configured to store carbon dioxide gas, a cold water storage unit configured to store cold water, a producing tank defining a closed space where the carbonated water is produced, a water supply passage configured to connect the cold water storage unit to the producing tank, the water supply passage including a water supply valve that controls supply of the cold water, a gas supply passage connecting the gas cylinder to the producing tank, the gas supply passage including a gas valve that controls supply of the carbon dioxide, a first relief valve provided along the gas supply passage, the first relief valve configured to control the discharge of the carbon dioxide gas, a dispensing passage connecting the producing tank to a dispensing member, the dispensing member configured to dispense the carbonated water from a front surface of a refrigerator, where the dispensing passage includes a dispensing valve that controls flow of the carbonated water, a second relief valve in communication with an upper portion of the producing tank, where the second relief valve configured to control discharge of air within the producing tank, and a controller configured to control operation of the first relief valve and the second relief valve, where the controller may be configured to control the gas valve to remain in an opened position until the carbonated water in the producing tank meets a preset concentration, and where the second relief valve may be configured to have a preset pressure that is greater than the atmospheric pressure and less than the pressure of the first relief valve, and where the carbon dioxide gas is continuously injected into the producing tank based on the second relief valve being oriented in an opened position.

Implementations according to this aspect may include one or more of the following features. For example, the second relief valve may be provided in the producing tank. An exhaust passage connected to an upper portion of the producing tank and including an exhaust valve that may control exhaust of air within the producing tank, where the second relief valve may be provided in the exhaust passage. One or more regulators configured to maintain pressure of the supplied carbon dioxide and the dispensed carbonated water, at least one of the one or more regulators may be provided in each of the gas supply passage and the dispensing passage. An injection nozzle that may be configured to inject the carbon dioxide gas and that may be provided on a first end of the gas supply passage, where the injection nozzle may be positioned to be immersed in the cold water based on the cold water of the producing tank being at a full level state. A connection passage that may be in communication with the producing tank and that may be provided in a lower portion of the producing tank, where the connection passage, the water supply passage, and the dispensing passage are connected to a switching valve configured to selectively connect the passages to each other. The producing tank may be injection-molded using a plastic material to define a space therein. A water level detection device may be provided on an outer surface of the producing tank, where the water level detection device may be configured to detect a variation in capacitance to detect a water level within the producing tank. A connection passage that may be in communication with the producing tank and that is provided in a lower portion of the producing tank, where the connection passage, the water supply passage, and the dispensing passage are connected to a switching valve configured to selectively connect the passages to each other, and where the gas supply passage may be connected to the connection passage between the switching valve and the producing tank. A check valve, which may be configured to prevent the carbonated water from flowing in a reverse direction, into the gas supply passage. A pressing passage that connects the gas supply passage to an upper portion of the producing tank, where the pressing passage is opened to allow the carbon dioxide gas to be injected into the producing tank based on the carbonated water being dispensed. An exhaust passage connected to an upper portion of the producing tank and including an exhaust valve, where the exhaust valve may be configured to control the exhaust of air within the producing tank, and where the pressing passage may be connected to the exhaust passage.

According to another aspect, a refrigerator including an apparatus for producing carbonated water, the refrigerator including a cabinet that defines a refrigerating compartment and a freezing compartment, a door that may be configured to open and close at least a portion of the cabinet, a dispenser mounted to a front surface of the door, a cold water storage unit provided in the door, the cold water storage unit configured to be cooled by cool air of the refrigerating compartment, and an apparatus for producing the carbonated water, the apparatus mounted to the door, the apparatus configured to mix cold water from the cold water storage unit with a carbon dioxide gas and supply the mixture to the dispenser, where the apparatus for producing the carbonated water includes a gas cylinder detachably mounted to the door and configured to store carbon dioxide gas, a producing tank connected to the gas cylinder, the cold water storage unit, and the dispenser by one or more connection passages, the producing tank defining a closed space where the carbonated water is produced, a plurality of valves provided in the one or more connection passages, and configured to open and close the one or more connection passages, a first relief valve provided along the passage configured to supply the carbon dioxide gas into the producing tank, the first relief valve configured to control discharge of the carbon dioxide gas when the supplied carbon dioxide gas has a pressure greater than a preset pressure, a second relief valve in communication with an upper portion of the producing tank, the second relief valve configured to have a preset pressure that is greater than the atmospheric pressure and less than that of the first relief valve, and a controller configured to control the first relief valve and the second relief valve so that the carbon dioxide gas is continuously supplied until the carbonated water within the producing tank meets a preset concentration.

Implementations according to this aspect may include one or more of the following features. For example, an ice making chamber that may be configured to make ice, that may be disposed in an upper portion of the door, and that may communicate with the dispenser, and where the apparatus for producing the carbonated water is disposed under the ice making chamber. The cold water storage unit and the apparatus for producing the carbonated water are accommodated into a recessed space of a door liner defining a back surface of the door. The recessed space may be in communication with the refrigerating compartment to allow cool air to be introduced into the recessed space. The recessed space may be covered by a detachable cover. An ice making chamber door configured to open and close the ice making chamber, and a basket disposed on the ice making chamber door and configured to define an accommodation space. An opening on which the gas cylinder is detached may be defined in the cover at a position corresponding to the gas cylinder, and the refrigerator further includes a cylinder cover configured to open and close the opening. A connection passage disposed in a lower portion of the producing tank, and where the connection passage is branched into a water supply passage connected to the cold water storage unit and a dispensing passage connected to the dispenser by a switching valve to allow the dispenser to selectively dispense the cold water and the carbonated water through the dispensing passage.

According to another aspect, an apparatus for producing carbonated water includes a water tank configured to store water for producing the carbonated water, a water supply passage connected to a cold water storage unit to supply the water, a gas cylinder configured to store a carbon dioxide gas, a gas supply passage connected to the gas cylinder to supply the carbon dioxide gas, a mixing unit connected to the water supply passage and the gas supply passage, and the mixing unit may be configured to mix received water and carbon dioxide, where the carbon dioxide gas is introduced by a low pressure generated by a flow velocity of the water received, a dispensing passage connected to the mixing unit configured to discharge the produced carbonated water, and a pressing passage branched from the gas supply passage and connected to the water supply passage, the pressing passage configured to supply and press a portion of the gas within the gas supply passage so that the water supplied into the mixing unit is supplied at a predetermined pressure.

Implementations according to this aspect may include one or more of the following features. For example, a gas regulator for supplying the carbon dioxide gas into the mixing unit is disposed in the gas passage, and a pressing regulator for supplying the carbon dioxide into the water supply passage may be disposed in the pressing passage, where the pressing regulator is set to a pressure greater than that of the gas regulator. A dispensing regulator configured to dispense the carbonated water produced in the mixing passage may be disposed in the dispensing passage, and herein the dispensing regulator is set to a pressure between the pressure of the pressing regulator and the pressure of the gas regulator. The gas cylinder may be detachably connected to a head unit in which a gas valve may be configured to connect the pressing passage to the gas supply passage is disposed. The gas regulator and the pressing regulator may be provided in the form of an assembly together with the head unit to connect the gas supply passage to the pressing passage. The gas supply passage may be branched into a pair, and the pair of gas supply passages are connected to both sides of the mixing unit, respectively.

According to yet another aspect, a refrigerator includes an apparatus for producing carbonated water, the refrigerator including a cabinet defining a refrigerating compartment and a freezing compartment, a door configured to open and close each of the refrigerating compartment and the freezing compartment, an ice making chamber mounted to the door, and in which an ice maker is accommodated, a dispenser for dispensing ice within the ice making chamber and the apparatus for producing the carbonated water may be accommodated in a space of a back surface of the door, the apparatus connected to the dispenser to produce and dispense the carbonated water, where the apparatus for producing the carbonated water includes a gas cylinder configured to store a carbon dioxide gas, a mixing unit connected to the a water tank for the carbonated water and the gas cylinder, and where the carbon dioxide gas is introduced by a low pressure generated by flow velocity of introduced water to produce the carbonated water, a water supply passage configured to connect the water tank for the carbonated water to the mixing unit, a gas supply passage configured to connect the gas cylinder to the mixing unit, a dispensing passage configured to connect the mixing unit to the dispenser, and a pressing passage branched from the gas supply passage and connected to the water supply passage, the pressing passage configured to supply and press a portion of the gas within the gas supply passage so that the water supplied into the mixing unit is supplied at a predetermined pressure.

Implementations according to this aspect may include one or more of the following features. For example, a gas regulator configured to supply the carbon dioxide gas at a predetermined pressure into the mixing unit is disposed in the gas passage, and a pressing regulator configured to supply the carbon dioxide gas at a predetermined pressure into the water supply passage is disposed in the pressing passage, where the pressing regulator is set to a pressure greater than that of the gas regulator. A dispensing regulator configured to dispense the carbonated water produced in the mixing passage at a predetermined pressure is disposed in the dispensing passage, and the dispensing regulator is set to a pressure between the pressure of the pressing regulator and the pressure of the gas regulator. A water tank configured to supply cold water into the ice maker, the dispenser, and the water tank for the carbonated water are disposed in the door. An exhaust valve is disposed in the water tank for the carbonated water and wherein the exhaust valve opens and closes to communicate with external air, and is opened when the water is supplied, or the carbonated water is dispensed. The apparatus for producing the carbonated water is accommodated in a recessed space of a door liner defining an inner surface of the door and disposed under the ice making chamber. The space communicates with the refrigerating compartment. One nozzle is connected to the dispenser to selectively dispense the cold water and the carbonated water. Nozzles for respectively dispensing the cold water and the carbonated water are disposed in the dispenser.

The details of one or more implementations are set forth in the accompanying drawings and the description below. Other features will be apparent from the description and drawings, and from the claims.

DETAILED DESCRIPTION OF THE IMPLEMENTATIONS

Reference will now be made in detail to the implementation of the present disclosure, examples of which are illustrated in the accompanying drawings.

For convenience of description and understanding of a refrigerator according to an implementation, although a bottom freezer type refrigerator in which a pair of doors are disposed on left and right sides of a refrigerating compartment is described as an example, the present disclosure is not limited thereto. For example, the current implementation may be applied to all types of refrigerators in which doors are rotatably mounted through a hinge.

Figure 1:
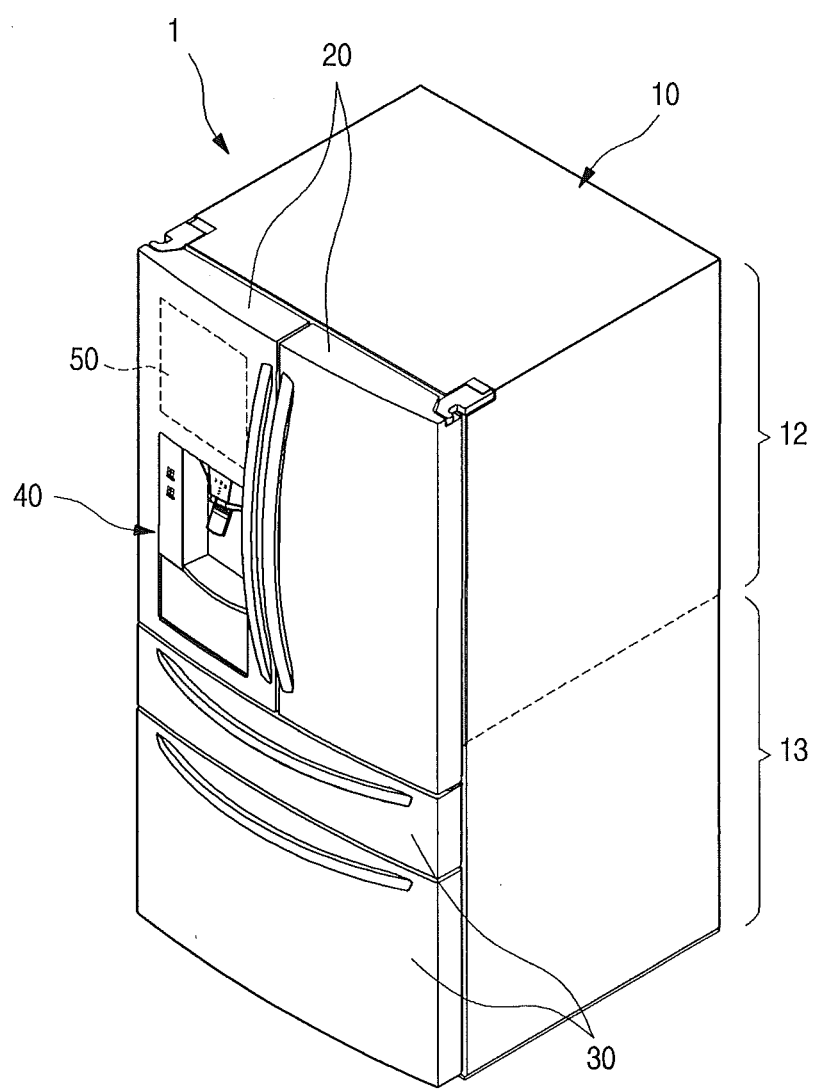
FIG. 1 is a perspective view of a refrigerator according to a first implementation.
Figure 2:
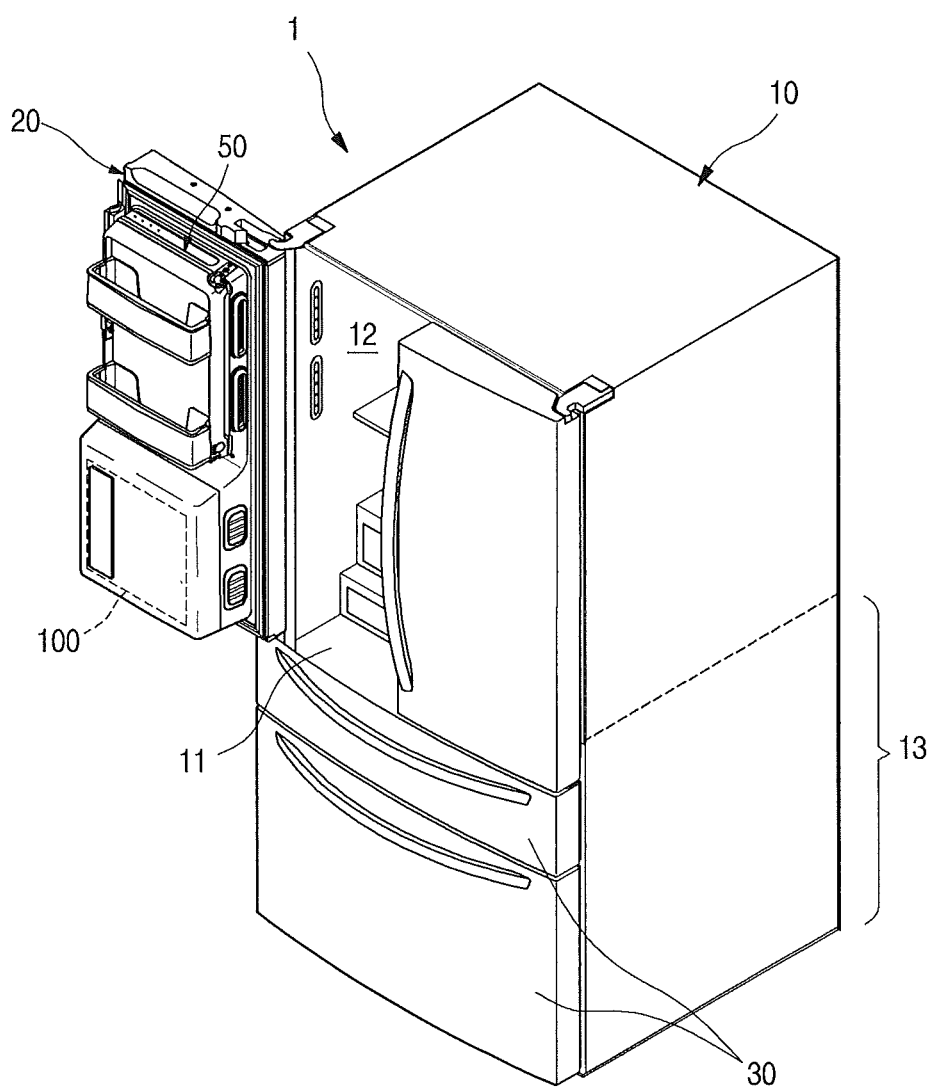
FIG. 2 is a perspective view of the refrigerator with a door in an opened position.

Referring to FIG. 1, a refrigerator 1 according to an implementation includes a cabinet 10 defining a storage space and a door disposed on a front surface of the cabinet 10 to open and close the storage space. Here, an outer appearance of the refrigerator 1 may be defined by the cabinet 10 and the door.

The storage space within the cabinet 10 may be vertically partitioned by a barrier 11 to define a refrigerating compartment 12 at an upper side and a freezing compartment 13 at a lower side of the cabinet 10. Also, a plurality of shelves and drawers may be disposed inside the freezing compartment 12 and the refrigerating compartment 13 to accommodate foods.

The door may include a refrigerating compartment door 20 for opening/closing the refrigerating compartment 11 and a freezing compartment door 30 for opening/closing the freezing compartment 12. The freezing compartment door 30 may be disposed on a front surface of the freezing compartment 13. The freezing compartment door 30 may be inserted into or withdrawn from the freezing compartment 13 like a drawer.

The freezing compartment 13 may be partitioned into vertical two compartments, and one of the upper and lower compartments may be used as the freezing compartment 13. Each of the upper and lower compartments may be adjusted in temperature and define an independent storage space. Thus, one compartment of the upper and lower compartments may be utilized as a storage space having a temperature higher than that of the freezing compartment 13. Also, the freezing compartment door 30 may be configured to independently withdraw each of the upper and lower compartments.

The refrigerating compartment door 20 may be provided in a pair on both left and right sides of a front surface of the refrigerating compartment 12. The pair of refrigerating compartment doors 20 may be independently rotatably mounted to open and close the refrigerating compartment 12. An ice making device for making and storing ice, and a dispenser 40 for dispensing the ice made in the ice making device 40 may be mounted to the outside of one of the left or right refrigerating compartment doors 20.

The dispenser 40 may be provided in a front surface of the refrigerating compartment door 20 to dispense water or ice through the front surface of the refrigerating compartment door 20. For this, the dispenser 40 may be connected to an external water supply source, and a water purifying filter may be further provided in a passage. Also, the dispenser 40 may be configured to dispense carbonated water supplied from an apparatus 100 (hereinafter, referred to as a carbonated water producing apparatus) for producing the carbonated water as well as the ice and water.

The ice making device is accommodated into an ice making chamber 50 that is defined by recessing a door liner 21 disposed on a rear surface of the refrigerating compartment door 20. The ice making device may include an ice maker 51 for making ice and an ice bank 52 for storing the ice made in the ice maker 51. The ice bank 52 may communicate with the dispenser 40 to dispense the ice within the ice bank 52 when the dispenser 40 is operated.

The ice making chamber 50 may be opened and closed by an ice making chamber door 53 to define an insulation space that is independent from the refrigerating compartment 12. A separate basket 54 for accommodating may be provided in an outer surface of the ice making chamber door 53.

Figure 3:
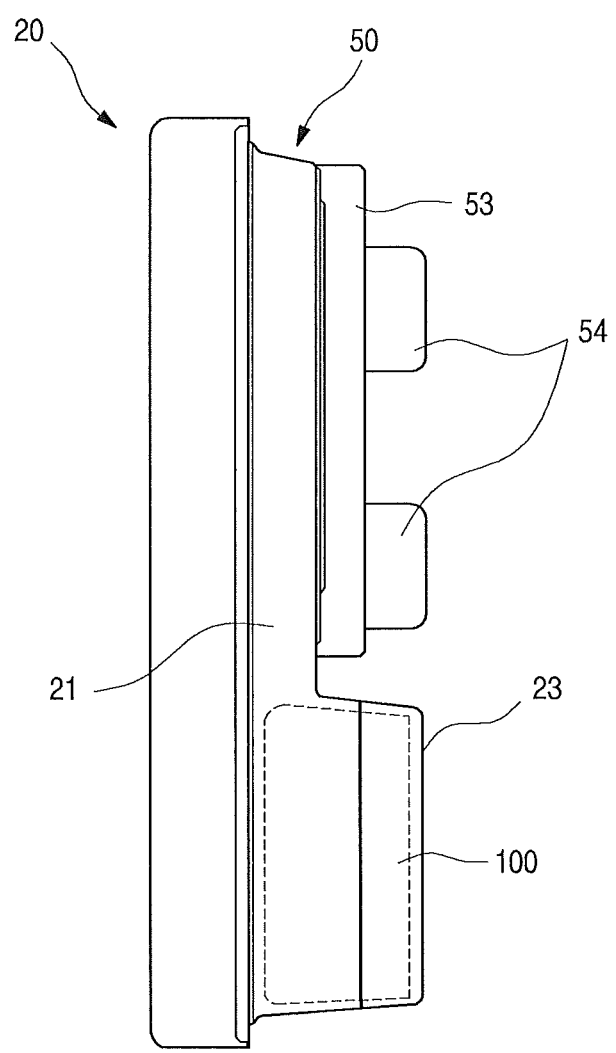
FIG. 3 is a perspective view of the refrigerator door when viewed in a lateral direction.
Figure 4:
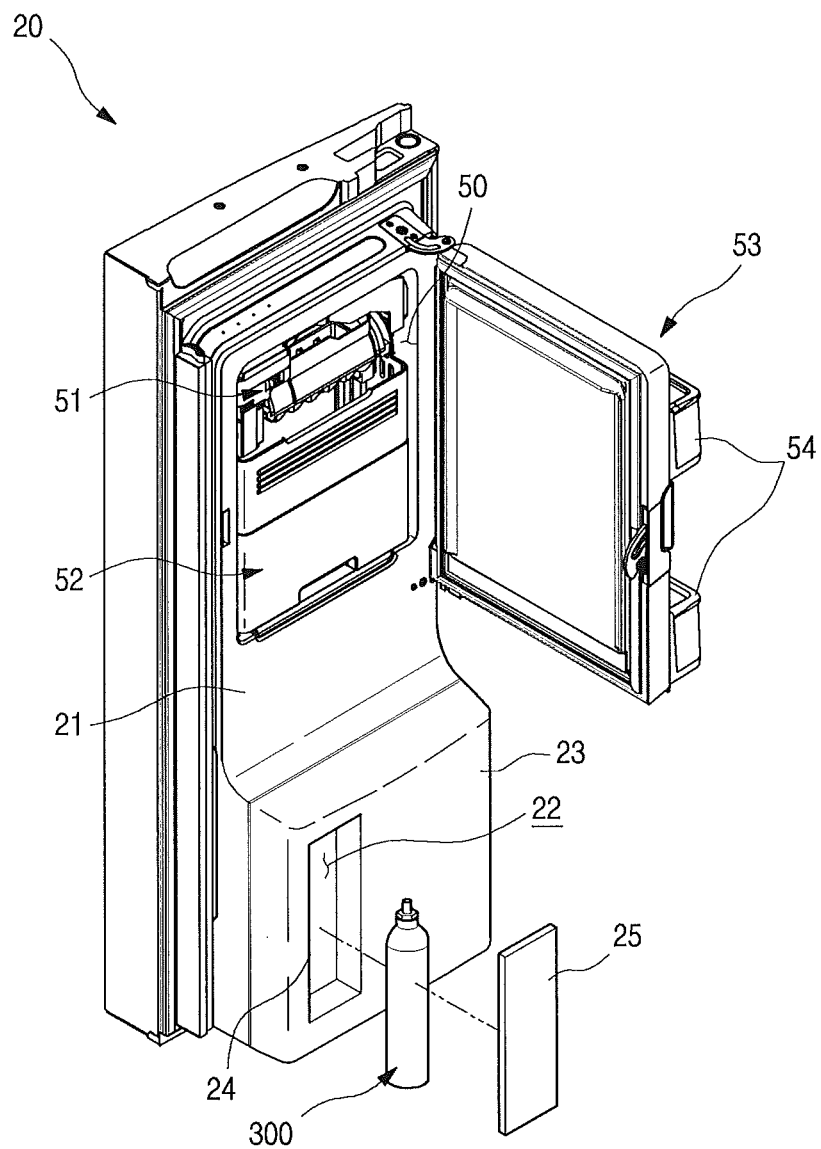
FIG. 4 is a perspective view illustrating a state in which a gas cylinder is mounted on the door of the refrigerator.
Figure 5:
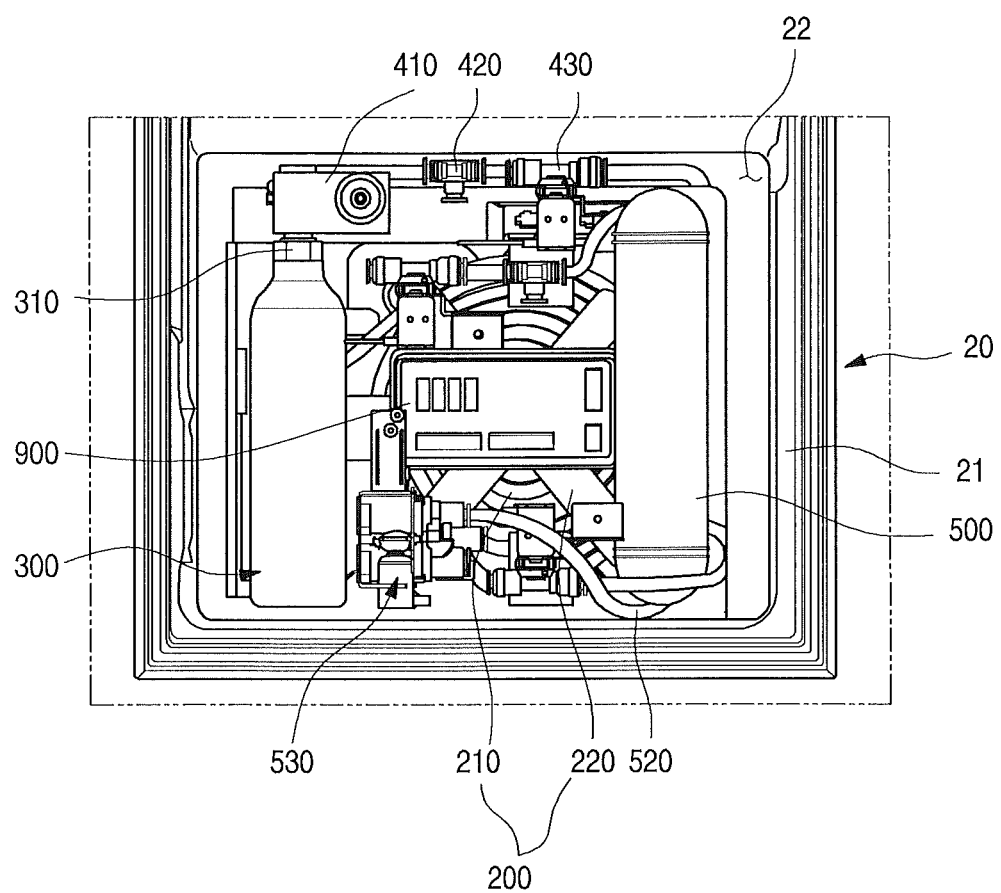
FIG. 5 is a front view illustrating a state in which an apparatus for producing carbonated water is mounted on the door of the refrigerator.
Figure 6:
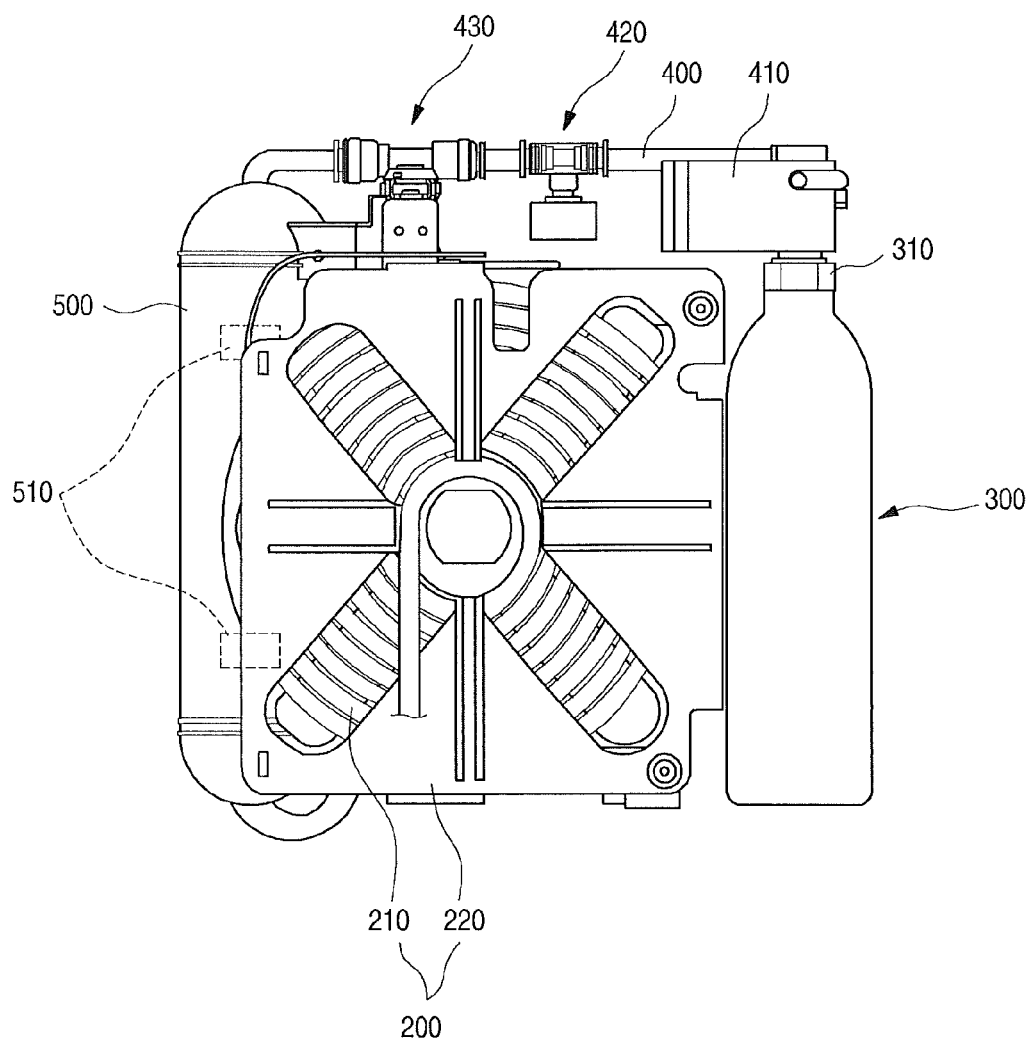
FIG. 6 is a rear view of the apparatus for producing the carbonated water and a cold water storage unit.
Figure 7:
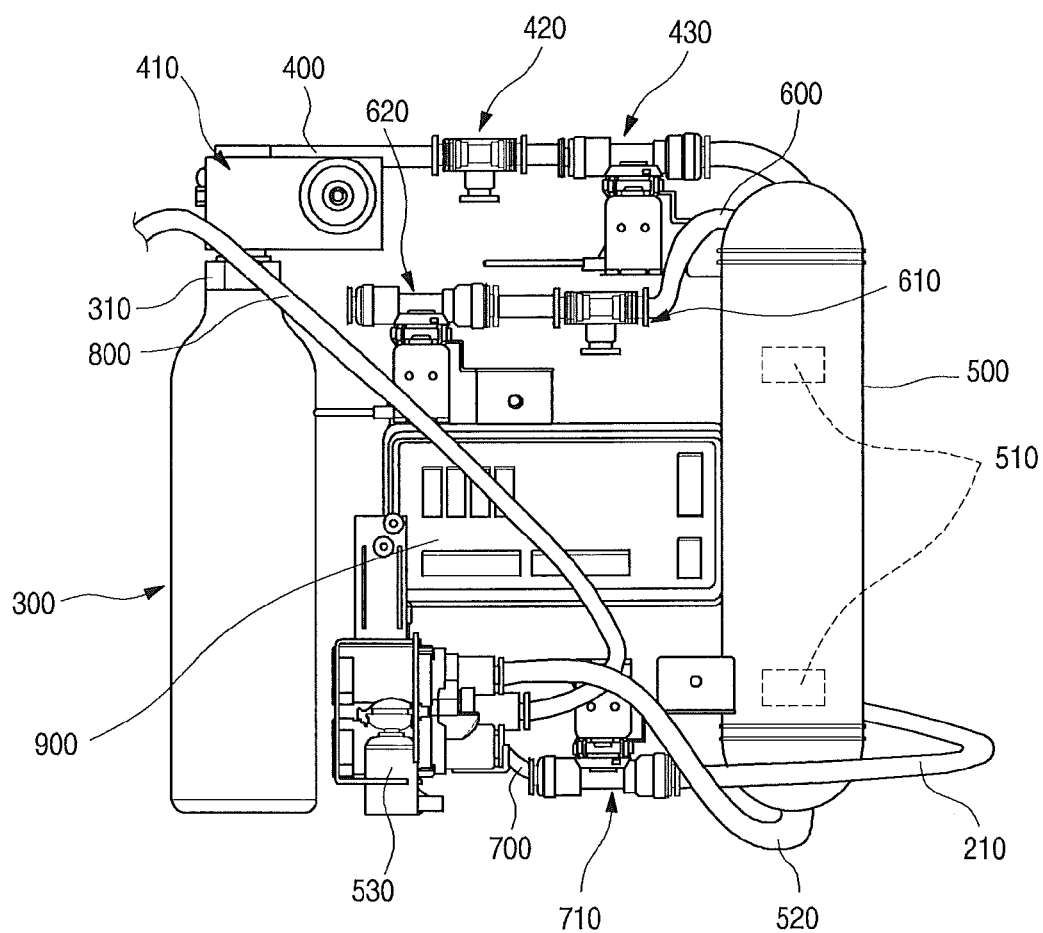
FIG. 7 is a front view of the apparatus for producing the carbonated water.
Figure 8:
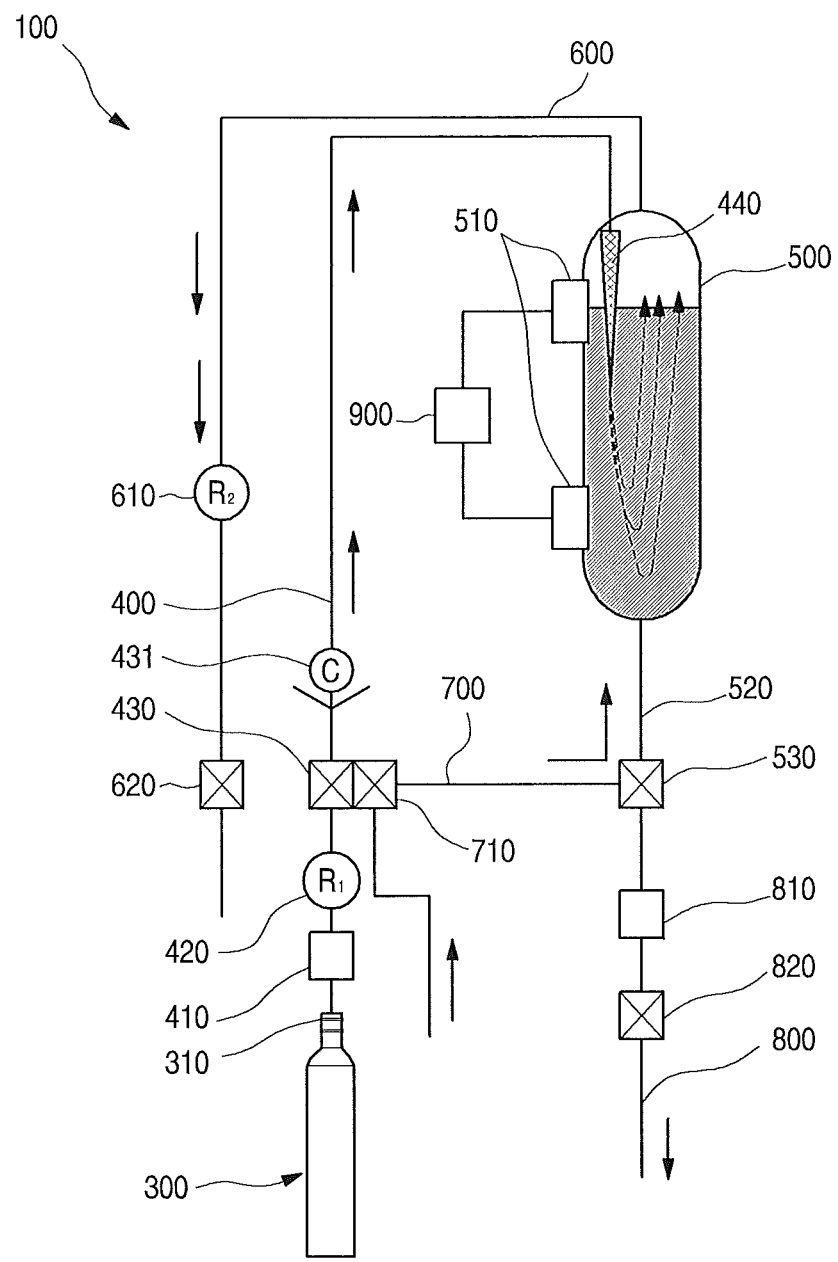
FIG. 8 is a schematic view illustrating a process of producing and discharging the carbonated water in the apparatus for producing the carbonated water.

Referring to FIGS. 3 and 4, the ice making chamber 50 is defined in an upper region of the rear surface of the refrigerating compartment door 20, and a space 22 in which the carbonated water producing apparatus 100 is disposed is defined below the ice making chamber 50, i.e., a lower region of the refrigerating compartment door 20.

In detail, the carbonated water producing apparatus 100 may also be disposed inside a space that is defined by recessing the door liner 21 defining the rear surface of the refrigerating compartment door 20. The space in which the carbonated water producing apparatus 100 is mounted may be opened and closed by a separate cover 23.

A lower portion of the refrigerating compartment door 20, in which the carbonated producing apparatus 100 is disposed may further protrude from the ice making chamber 50 and the ice making chamber door 53 to provide the space 22 in which the carbonated water producing apparatus 100 is accommodated. The lower portion of the refrigerating compartment door 200 may not interfere with shelves or drawers within the refrigerating compartment 12 in a state where the refrigerating compartment door 20 is closed.

The carbonated water producing apparatus 100 may include a gas cylinder 300 in which a carbon dioxide gas is stored, a producing tank 500 in which gas and water supplied from the gas cylinder 300 are mixed with each other to produce the carbonated water, various valves disposed in passages connecting the gas cylinder 300, the producing tank 500, and the dispenser to each other, and a controller 900 for controlling electronic components the valves and the like.

The gas cylinder 300 may be exposed to the outside through an opening 24 defined in the rear surface of the refrigerating compartment door 20. The gas cylinder 300 may be easily displaced and detached by a user. A cylinder cover 25 may be further disposed on the opening 24 through which the gas cylinder 300 is inserted or withdrawn. The opening 24 may be covered by the cylinder cover 25.

Referring to FIGS. 5 to 8, the carbonated water producing apparatus 100 is disposed in the space 22 defined by the door liner 21. A cold water storage unit 200 may be disposed at the most inner side of the space 22, and the carbonated water producing apparatus 100 connected to the cold water storage unit 200 may be disposed at a front side of the cold water storage unit 200.

The cold water storage unit 200 may include a storage tube 210 in which water is stored and a mounting member 220 on which the storage tube 210 is mounted. The storage tube 210 has a tube shape connected to the water supply source to store water supplied from the water supply source.

The storage tube 210 may be disposed to be continuously wound around the mounting member 220. Here, the storage tube may be continuously wound in a circular shape with respect to one side thereto. Thus, the storage tube 210 may have a slim circular plate shape on the whole in the state where the storage tube 210 is wound.

The mounting member 220 may support the storage tube 210 so that the storage tube 210 is wound, and also, the wound storage tube is fixed to an inner wall of the space 22 in which the carbonated water producing apparatus 100 is mounted.

The space in which the storage tube 210 is accommodated may communicate with the space 22 of the refrigerating compartment 12. Therefore, the inside of the space 22 and the storage tube 210 may be cooled by introduction of cool air circulated in the refrigerating compartment 12. The water stored in the storage tube 210 may be dispensed through the dispenser 40 in a state where the water is cooled or be supplied into the producing tank 500 for producing the carbonated water.

The carbonated water producing apparatus 100, may be disposed at a front side of the cold water storage unit 200 and connected to the gas cylinder 300, the producing tank 500, and the plurality of valves through the passages.

In more detail, the gas cylinder 300 may be a container in which the carbon dioxide gas is stored and be detachably disposed on the carbonated water producing apparatus 100. A connection tool 310 may be connected to an upper end of the gas cylinder 300. When the connection tool 310 is connected, the carbon dioxide gas within the gas cylinder 300 may be discharged. Also, the carbon dioxide gas may be injected and charged into the gas cylinder 300 through the connection tool 310. As described above, the gas cylinder 300 may be used as the gas cylinder 300 for producing the carbonated water, which is commonly used. That is, the existing product may be used as the gas cylinder 300.

A gas regulator 410, a first relief valve 410, and a gas valve 430 may be successively provided in a gas supply passage 400 connecting the gas cylinder 300 to the producing tank 500. The carbon dioxide gas within the gas cylinder 300 may be supplied into the producing tank 500 by successively passing through the gas regulator 410, the first relief valve 420, and the gas valve 430 through the gas supply passage 400.

The gas regulator 410 may discharge the carbon dioxide discharged from the gas cylinder 300 at a predetermined pressure. The gas regulator 410 may be provided as a module having a shape that is capable of being connected to the connection tool 310.

The first relief valve 420 may prevent a pressure of the carbon dioxide supplied from the gas cylinder 300 from exceeding a preset pressure, i.e., prevent the producing tank 500 or the valves from being damaged by an excessive pressure applied into the producing tank 500 due to the injection of the gas.

The first relief valve 420 may be previously set to a pressure of about 5 $Kgf/cm^2$ to about 8 $Kgf/cm^2$. The preset pressure may correspond to an inner pressure of the producing tank 500. That is, the preset pressure may be a pressure that is adequate for producing carbonated water having a reasonable concentration under the temperature of the refrigerating compartment 12, and also be a pressure at which the producing tank 500 and the plurality of valves normally operate without being damaged.

The gas valve 430 may be disposed between the first relief valve 420 and the producing tank 500. The gas valve 430 may open and close a flow path of the carbon dioxide gas supplied into the producing tank 500, and the opening/closing of the gas valve 430 may be controlled by the controller 900 connected thereto. Thus, the gas valve 430 may operate according to the control of the controller 900 to determine the supply of the carbon dioxide into the producing tank 500.

A check valve 431 for preventing the gas within the producing tank 500 from flowing backward may be further provided between the gas valve 430 and the producing tank 500. The gas valve 430 and the check valve 431 may be coupled to each other to form one assembly. As necessary, the gas valve 430 and the check valve 431 may be coupled to at least one of an exhaust valve 620, a water supply valve 710, and a dispensing valve 820, which will be described below, to form one assembly.

The producing tank 500 may provide a space in which the carbon dioxide gas and the cold water supplied from the cold water storage unit 200 are mixed with each other. The producing tank 500 may be provided in a tank shape having a predetermined volume.

The producing tank 500 may be injection-molded by using a plastic material. The producing tank 500 has top and bottom surfaces each of which has a hemispherical shape to prevent the producing tank 500 from being damaged or deformed by an inner pressure thereof. Also, the producing tank 500 may be connected to each of the gas supply passage 400, the exhaust passage 600, the water supply passage 700, and the dispensing passage 800. The connection part of the producing tank 500, which is connected to each of the passages may be integrated with the producing tank 500 when the producing tank 500 is molded.

An injection nozzle 400 for injecting a gas is provided on an end of the gas supply passage 400. Also, the injection nozzle 440 may be disposed inside the producing tank 500. The gas supply passage 400 may be inserted downward from the top surface of the producing tank 500. An end of the injection nozzle 440 from which carbon dioxide is injected may be disposed in a lower portion of the producing tank 500 and immersed in water within the producing tank 500.

The carbon dioxide injected from the injection nozzle 440 may maximally increase in contact time with the water within the producing tank 500 so that the carbon dioxide gas injected through the injection nozzle 440 is effectively dissolved into the water.

Although the injection nozzle 440 changes in position according to the structure and shape of the producing tank 500, the end of the injection nozzle 440, from which the carbon dioxide gas is injected, may be fully immersed in a state where water is filled into the producing tank 500.

A water level detection device 510 for detecting a water level of the inside of the producing tank 500 is disposed on an outer surface of the producing tank 500. A capacitive detection sensor for detecting the water level within the producing tank 500 at the outside of the producing tank 500 may be used as the water level detection device 510. The water level detection device 510 may be disposed on each of outer upper and lower portions of the producing tank 500 to detect a set lowest level and full level.

Also, the water level detection device 510 may be connected to the controller 900 so that an amount of water to be supplied and an amount of carbon dioxide to be injected into the producing tank 500 are determined according to the water level detected by the water level detection device 510.

The exhaust passage 600 may be further disposed on one side of the producing tank 500. The exhaust passage 600 may be a passage through which air within the producing tank 500 is discharged to the outside. A second relief valve 610 and an exhaust valve 620 may be further provided in the exhaust passage 600.

The second relief valve 610 may be opened to continuously inject the carbon dioxide when an inner pressure of the producing tank 500 reaches a preset pressure or more. That is, the second relief valve 610 may be opened at the preset pressure less than that of the first relief valve 420. The second relief valve 610 may be set to a pressure that is greater than the atmospheric pressure and is somewhat less than that of the first relief valve 420.

Thus, even though the carbon dioxide gas is injected into the producing tank 500, the inner pressure of the producing tank 500 may not increase over the preset pressure of the first relief valve 420 by the second relief valve 610 to continuously inject the carbon dioxide gas, thereby producing carbonated water having an adequate concentration.

The exhaust valve 620 may be configured to exhaust the air within the producing tank 500 while the cold water is supplied into the producing tank 500. The exhaust valve 620 may be configured to naturally exhaust the air within the producing tank 500 by the pressure of the cold water injected into the producing tank 500.

The exhaust valve 620 may also be connected to the controller 900. The exhaust valve 620 may be opened according to a water supply command of the controller 900 to prevent the inner pressure of the producing tank 500 from increasing so that the water is smoothly supplied into the producing tank 500.

The storage tube 210 of the cold water storage unit 200 may be connected to the water supply passage 700, and the water supply passage 700 may be connected to a switching valve 530. The switching valve 530 may be connected to the connection passage 520 connected to the producing tank 500. Thus, the cold water stored in the storage tube 210 may be supplied into the producing tank 500 via the water supply passage 700, the switching valve 530, and the connection passage 520.

Also, the water supply valve 710 may be provided in the water supply passage 700. The water supply valve 710 may open and close the water supply passage 700 to supply the water stored in the storage tube 210 to be supplied into the producing tank 500. An operation of the water supply valve 710 may be controlled by the controller 900.

A separate passage is defined in the water supply passage 700 and thus connected to the storage tube 210. As necessary, the storage tube 210 itself may be provided as the water supply passage 700, and the water supply valve 710 may be provided in the storage tube 210 so that the storage tube 210 is connected between the water supply valve 710 and the switching valve 530.

The connection passage 520 connects one side of the producing tank 500 to the switching valve 530. Also, the connection passage 520 may serve as a passage for supplying the cold water into the producing tank 500 and a passage for discharging the carbonated water produced in the producing tank 500.

That is, when the cold water is supplied into the producing tank 500, the switching valve 530 may allow the water supply passage 700 to communicate with the connection passage 520 according to an operation of the switching valve 530, thereby supplying the cold water within the storage tube 210 into the producing tank 500. Also, in the state where the carbonated water is produced in the producing tank 500, the switching valve 530 may allow the connection passage 520 to communicate with the dispensing passage 800, thereby dispensing the carbonated water stored in the producing tank 500 into the dispenser 40 through the dispensing passage 800.

Also, if it is intended to dispense the cold water through the manipulation of the dispenser 40, the switching valve 530 may allow the water supply passage 700 to communicate with the dispensing passage 800, thereby dispensing the cold water stored in the storage tube 210 through the dispenser 40.

The dispensing passage 800 may connect the switching valve 530 to the dispenser 40 to dispense the cold water or the carbonated water through the dispenser 40. Also, a dispensing regulator 810 and a dispensing valve 820 are provided in the dispensing passage 800.

The dispensing regulator 810 may dispense the water while the water dispensed from the producing tank 500 is maintained at a preset pressure. Also, the dispensing valve 820 may selectively open or close the dispensing passage 800 according to the manipulation of the dispenser 40 to dispense the cold water and the carbonated water and prevent remnant water existing in the dispensing passage 800 from flowing down. Thus, the dispensing valve 820 may be disposed at a position that is adjacent to an outlet-side of the dispenser 40.

Figure 9:
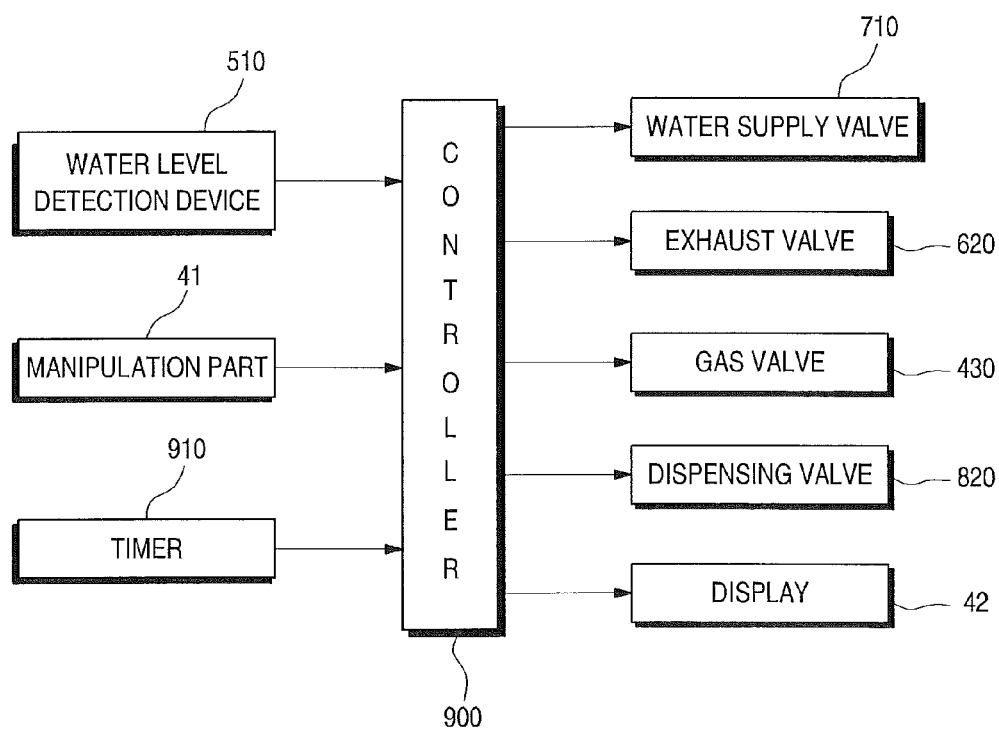
FIG. 9 is a block diagram illustrating a flow of a signal for controlling a valve constituting the apparatus for producing the carbonated water.
Figure 10:
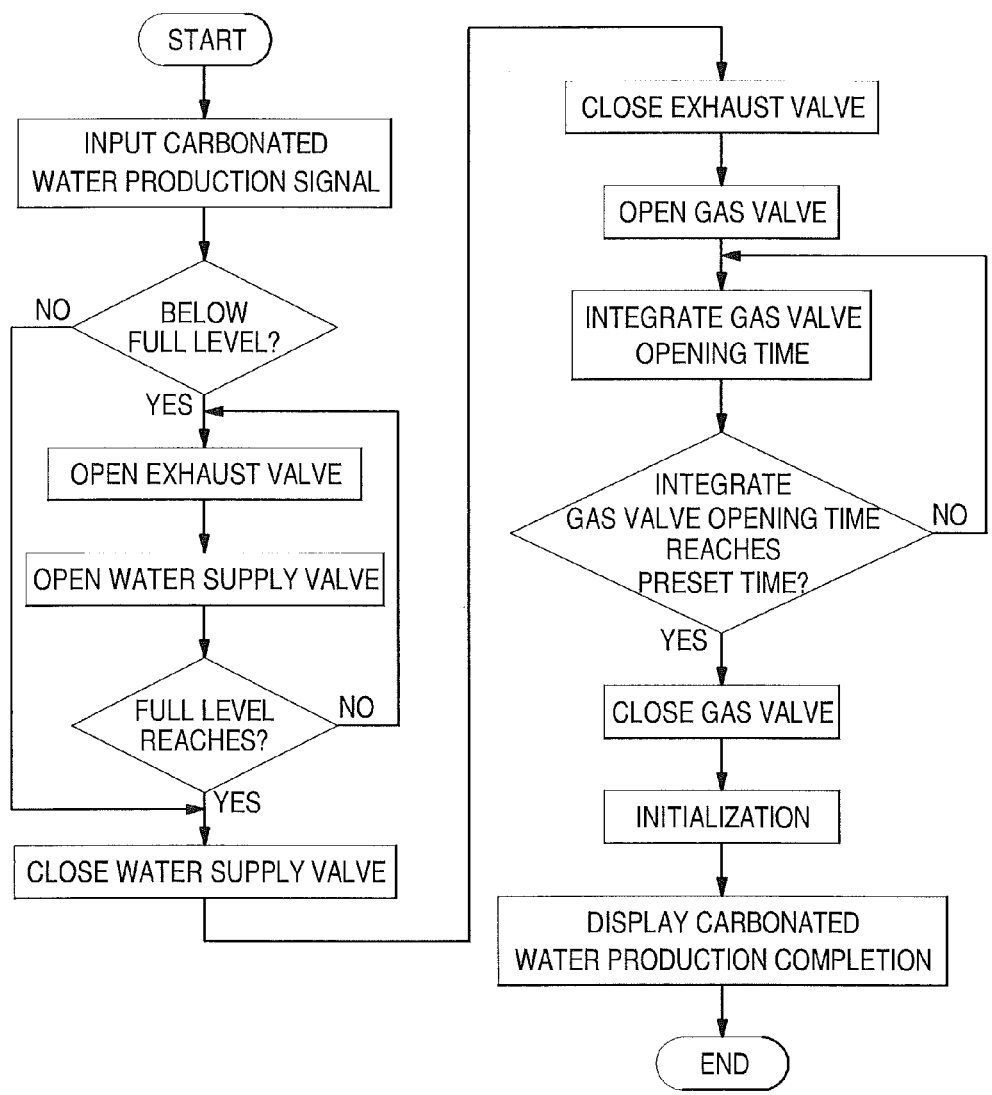
FIG. 10 is a flowchart of the process of producing the carbonated water in the refrigerator.
Figure 11:
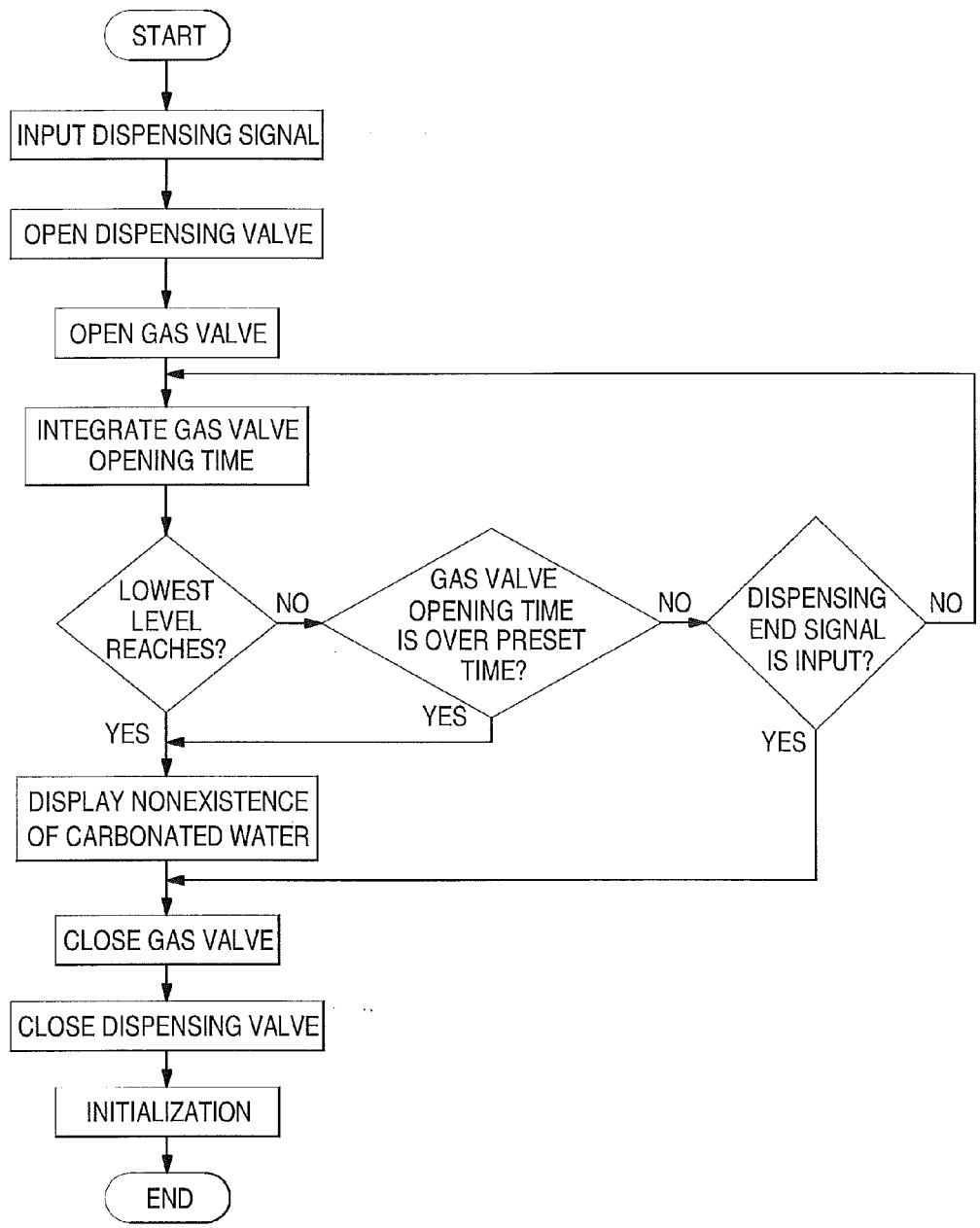
FIG. 11 is a flowchart of the process of dispensing the carbonated water from the refrigerator.

As illustrated in FIGS. 9 to 11, a signal for producing carbonated water may be inputted into a controller 900. The signal for producing the carbonated water may be inputted by manipulating a manipulation part 41 disposed on a side of a dispenser 40 or refrigerating compartment door 20 by a user. Also, when a preset time or condition that is set by preset program is satisfied, the signal for producing the carbonated water may be inputted into the controller 900.

After the signal for producing the carbonated water is inputted, a water level within the producing tank 500 is detected by a water level detection device 510. The water level detection device 510 may be a capacitive detection sensor that is mounted on an outer portion of the producing tank 500. The water level detection device 510 may detect a water level within the producing tank 500 through a variation in capacitance.

When it is determined that the water level within the producing tank 500 is below the preset water level, the controller 900 may open an exhaust valve 620 and a water supply valve 710 to supply water into the producing tank 500.

The water stored in the storage tube 210 may flow along a water supply passage 700 by opening the water supply valve 710 in a state where the water is sufficiently cooled by cool air of a refrigerating compartment 12. Also, a switch valve 530 may operate by the controller 900 to connect the water supply passage 700 to a connection passage 520. Thus, the cold water flowing along the water supply passage 700 may be introduced into the producing tank 500 by successively passing through the switching valve 530 and the connection passage 520. Here, the exhaust valve 620 may be maintained in an opened state so that the water is smoothly supplied into the producing tank 500.

When a water level within the producing tank 500 reaches a full level as the water supply valve 710 is opened, each of the water supply valve 710 and the exhaust valve 620 may be closed, and the switching valve 530 may operate to connect the water supply passage 700 to the dispensing passage 800.

Simultaneously, the gas valve 430 may be opened to supply a carbon dioxide gas within a gas cylinder 300 into the producing tank 500 through a gas supply passage 400. Here, the carbon dioxide gas may be supplied into the producing tank 500 by successively passing through a gas regulator 410, a first relief valve 420, the gas valve 430, and a check valve 431.

The carbon dioxide gas discharged from the gas cylinder 300 may be supplied while being maintained at a predetermined pressure by the gas regulator 410. When the carbon dioxide gas flowing along the gas supply passage 400 has a pressure greater than a preset pressure, the gas may be discharged by the first relief valve 420 so that the gas is maintained to a pressure less than the preset pressure. Also, even though an inner pressure of the producing tank 500 increases, the backflow of the carbon dioxide gas may be prevented by the check valve 431.

While the carbon dioxide gas is supplied, a timer 910 may integrate an opening time of the gas valve 430. Thus, the gas valve 430 may be opened for a preset time to continuously supply the carbon dioxide gas into the producing tank 500 for the preset time.

Here, an injection nozzle 440 through which the carbon dioxide gas is discharged may inject the carbon dioxide gas downward in a state where the injection nozzle 440 is immersed in the water of the producing tank 500 to increase a stay time of the carbon dioxide gas so that the carbon dioxide gas is more effectively dissolved by the stored cold water.

When the opening time of the gas valve 430, which is integrated by the timer 910, reaches the preset time, carbonated water having a desired concentration may be produced in the producing tank 500. At the same time, the gas valve 430 may be closed, and then, the timer 910 may be initialized. Also, a display 42 disposed outside a dispenser 40 or refrigerating compartment door 20 may display an image for informing completion of the production of the carbonated water.

When the carbon dioxide gas is continuously supplied into the producing tank 500, the inner pressure of the producing tank 500 may increase. Here, although a preset pressure of a second relief valve 610 connected to the producing tank 500 is higher than the atmospheric pressure, the preset pressure of the second relief valve 610 may be less than that of the first relief valve 420.

Thus, if the inner pressure of the producing tank 500 increases, air within the producing tank 500 may be exhausted by the second relief valve 610, and thus, the inner pressure of the producing tank 500 may be maintained to a pressure less than that of the second relief valve 610. That is, even though the carbon dioxide gas is continuously supplied through the gas supply passage 400, it may prevent the producing tank 500 or the plurality of valves from being damaged by the pressure.

When the completion of the production of the carbonated water is outputted through the display 42, the user may manipulate the dispenser 40 to dispense the carbonated water.

When the user manipulates the display 42 to input a dispensing signal, the dispensing valve 820 may be opened first, and the switching valve 530 may be maintained in the state in which the connection passage 520 and the dispensing passage 800 are connected to each other. Also, the gas valve 430 may be opened to inject the carbon dioxide gas into the producing tank 500.

The inner pressure of the producing tank 500 may increase due to the injection of the carbon dioxide gas. As the inner pressure of the producing tank 500 increases, the carbonated water within the producing tank 500 may be supplied into the dispenser 40 via the dispensing regulator 810 and the dispensing valve 820. Here, the dispensing regulator 810 may be configured to uniformly maintain a pressure of the carbonated water that is dispensed through the dispensing passage 800.

As the carbonated water is dispensed, a water level within the producing tank 500 may gradually decrease. When the water level within the producing tank 500 reaches the lowest level, nonexistence of the carbonated water may be displayed through the display 42 because the carbonated water to be dispensed does not exist any more. Also, the gas valve 430 and the dispensing valve 820 may be successively closed, and then the timer 910 may be initialized to finish the dispensing of the carbonated water.

Thus, even though the water level within the producing tank 500 does not reach the lowest level, when the opening time of the gas valve 430 elapses the preset time, the gas valve 430 and the water supply valve may be closed to prevent the water level detection device from being malfunctioned. Also, the opening time of the gas valve may be integrated to determine that the gas within the gas cylinder is completely consumed. Also, although it is determined that the gas within the gas cylinder is completely consumed, the gas may be dispensed through the gas valve and the dispensing valve.

When a dispensing end signal is inputted through the manipulation part 41, the gas valve and the dispensing valve 820 may be closed, and the timer 910 may be initialized to finish the dispensing of the carbonated water.

For example, a refrigerator according to a implementation is characterized in that a structure in which injection of carbon dioxide and cold water and discharge of carbonated water are performed at the same time through a connection passage is provided.

Figure 12:
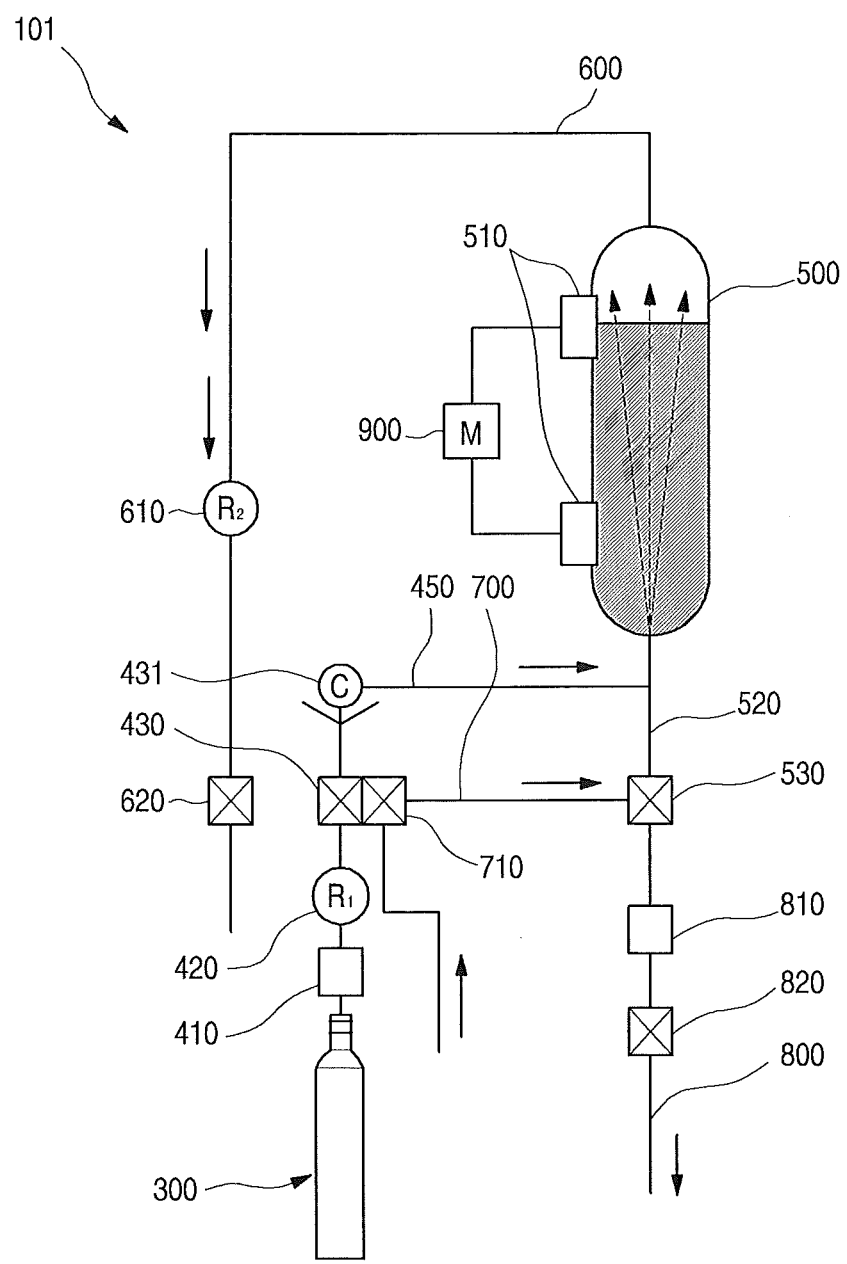
FIG. 12 is a schematic view illustrating a process of producing carbonated water and a path for discharging the carbonated water in an apparatus for producing the carbonated water of a refrigerator according to a second implementation.
Figure 13:
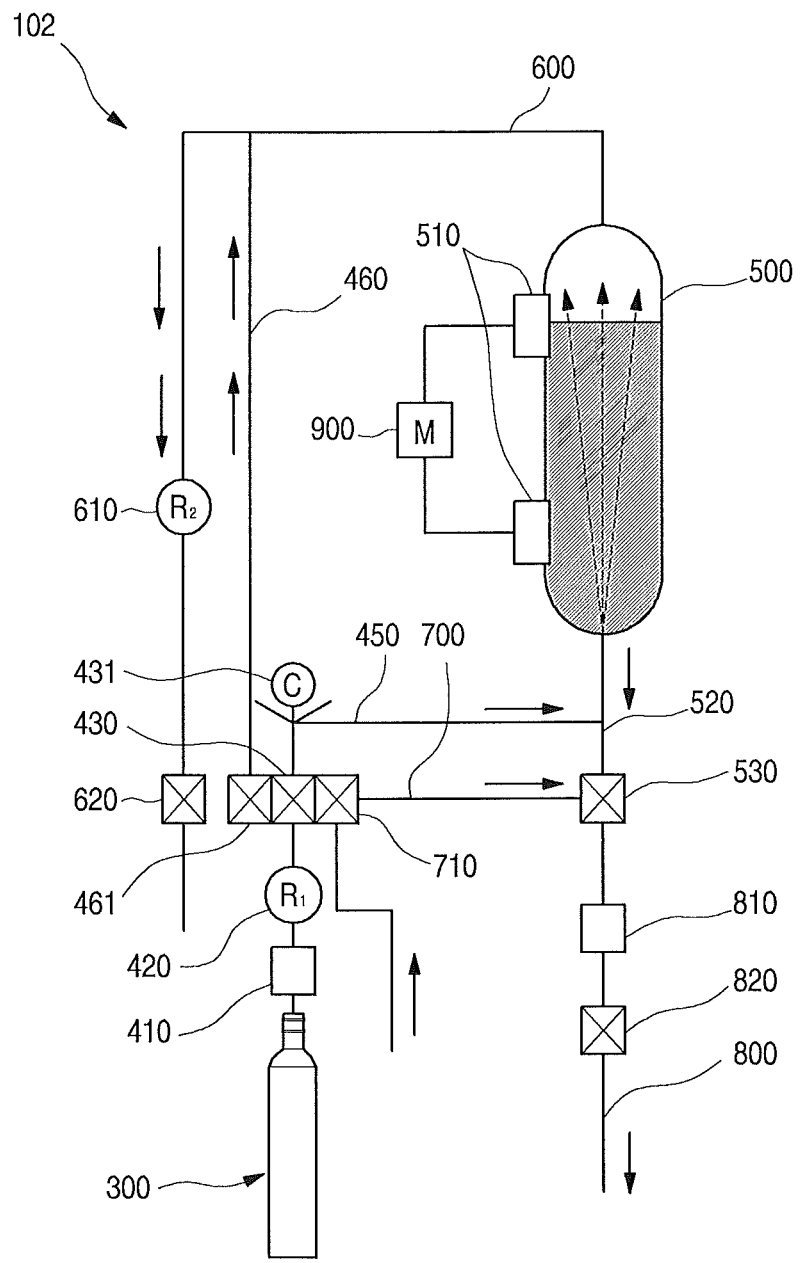
FIG. 13 is a schematic view illustrating a process of producing carbonated water and a path for discharging the carbonated water in an apparatus for producing the carbonated water of a refrigerator according to a third implementation.

FIG. 12 is a schematic view illustrating a process of producing and discharging carbonated water in an apparatus for producing the carbonated water of a refrigerator according to a second implementation.

Referring to FIG. 12, an apparatus 101 for producing carbonated water according to the second implementation includes a gas cylinder 300, a producing tank 500, a plurality of valves connecting the gas cylinder 300 to the producing tank 500, and electronic components.

Particularly, the producing tank 500 has a connection passage 520 connected to a switching valve 530, and a water supply passage 700 and a dispensing passage 800 are connected to the switching valve 530. A water supply valve 710 may be provided in the water supply passage 700. The water supply valve 710 may be connected to a storage tube 210 in which cold water is stored. Also, the dispensing passage 800 may connect the switching valve 530 to a dispenser 40. A dispensing regulator 810 and a dispensing valve 820 may be provided in the dispensing passage 800.

A gas supply passage 450 may connect the gas cylinder 300 to the connection passage 520. A gas regulator 410, a first relief valve 420, and a gas valve 430 may be successively provided in the gas supply passage 450. Also, the gas supply passage 450 and the connection passage 520 may be connected to communicate with each other. Thus, a gas within the gas supply passage 450 may be supplied into the producing tank 500 through the connection passage 520. The connection passage 520 may be connected to a lower portion of the producing tank 500 so that the gas and cold water are supplied into and dispensed from the producing tank 500.

Also, an exhaust passage 600 may be connected to an upper portion of the producing tank 500. A second relief valve 610 and an exhaust valve 620 may be provided in the exhaust passage 600. Here, the second relief valve 610 may have a preset pressure that is greater than the atmospheric pressure and less than that of the first relief valve 420. Thus, the gas may be continuously injected into the producing tank 500 until a concentration of carbon dioxide reaches a preset concentration.

Also, a water level detection device 510 that is provided as a capacitive sensor to detect a water level within the producing tank 500 may be provided on an outer surface of the producing tank 500. Also, the water level detection device 510, the gas valve 430, the water supply valve 710, the dispensing valve 820, and the exhaust valve 620 may be connected to the controller 900, and thus, operations of the water level detection device 510, the gas valve 430, the water supply valve 710, the dispensing valve 820, and the exhaust valve 620 may be controlled by the controller 900.

A process of producing carbonated water in the apparatus for producing the carbonated water in the refrigerator having the above-described structure according to an implementation will be described below.

First, when a water level within a producing tank 500, which is detected by a water level detection device 510, does not reach a full level, cold water is supplied from a storage tube 210. For this, a switching valve 530 may be switched to allow a water supply passage 700 to communicate with a connection passage 520. Thus, the water supply valve 710 may be opened to supply the cold water into the producing tank 500.

Here, backflow of the cold water in the producing tank 500 or the connection passage 520 may be prevented by a check valve 431 provided in a gas supply passage 450. Also, an exhaust valve 620 may be opened to prevent a pressure within the producing tank 500 from increasing when the cold water is supplied so that the cold water is smoothly supplied.

When the water level within the producing tank 500 reaches the full level, the exhaust valve 620 and the switching valve 620 may be closed. Then, the gas valve 430 may be opened to allow a gas within the gas cylinder 300 to be injected into a lower portion of the producing tank 500 through the connection passage 520 by successively passing through the gas regulator 410, the first relief valve 420, the gas valve 430, and the check valve 431. Here, a carbon dioxide gas injected into the producing tank 500 may be continuously injected for a preset time, and also, the gas valve 430 may be opened until a concentration of carbonated water within the producing tank 500 reaches a preset concentration.

When a pressure within the producing tank 500 is above a preset pressure of the second relief valve 610 while the carbon dioxide gas is injected into the producing tank 500, an increase in pressure within the producing tank 500 may be restricted by the second relief valve 610. That is, since the preset pressure of the second relief valve 610 is less than that of the first relief valve 420, when the carbon dioxide gas is injected, the preset pressure at which the carbonated water is easily produced may be maintained in the producing tank 500. Also, since the inner pressure of the producing tank 500 does not increase even though the carbon dioxide gas is continuously injected, the pressure at which the carbonated water is easily produced may be maintained even though the carbon dioxide gas is continuously injected.

When the gas valve 430 is opened for a preset time to complete the production of the carbonated water having a preset concentration, the switching valve 530 may connect the connection passage 520 to the dispensing passage 800. Thus, the produced carbonated water may be dispensed into the dispenser 40 through the dispensing passage 800 via the dispensing regulator 810 and the dispensing valve 820.

Alternatively, the switching valve 530 may be connected to the connection passage 520, the water supply passage 700, the dispensing passage 800, and the gas supply passage 450. Thus, the connection passage 520, the gas supply passage 450, the water supply passage 700, and the dispensing passage 800 may be controlled to be selectively connected to each other according to an operation of the switching valve 530.

For example, a refrigerator according to an implementation is characterized in that a structure in which injection of carbon dioxide and cold water and discharge of carbonated water are performed at the same time through a connection passage, and the carbonated water is more effectively discharged by a pressing passage for supplying the carbon dioxide when the carbonated water is discharged is provided.

FIG. 12 is a schematic view illustrating a process of producing carbonated water and a path for discharging the carbonated water in an apparatus for producing the carbonated water of a refrigerator according to an implementation.

Referring to FIG. 12, an apparatus 102 for producing carbonated water according to an implementation includes a gas cylinder 300, a producing tank 500, a plurality of valves connecting the gas cylinder 300 to the producing tank 500, and electronic components.

Particularly, the producing tank 500 has a connection passage 520 connected to a switching valve 530, and a water supply passage 700 and a dispensing passage 800 are connected to the switching valve 530. A water supply valve 710 may be provided in the water supply passage 700. The water supply valve 710 may be connected to a storage tube 210 in which cold water is stored. Also, the dispensing passage 800 may connect the switching valve 530 to a dispenser 40. A dispensing regulator 810 and a dispensing valve 820 may be provided in the dispensing passage 800.

A gas supply passage 450 may connect the gas cylinder 300 to the connection passage 520. A gas regulator 410, a first relief valve 420, and a gas valve 430 may be successively provided in the gas supply passage 450. Also, the gas supply passage 450 and the connection passage 520 may be connected to communicate with each other. Thus, a gas within the gas supply passage 450 may be supplied into the producing tank 500 through the connection passage 520. The connection passage 520 may be connected to a lower portion of the producing tank 500 so that the gas and cold water are supplied into and dispensed from the producing tank 500.

Also, an exhaust passage 600 may be connected to an upper portion of the producing tank 500. A second relief valve 610 and an exhaust valve 620 may be provided in the exhaust passage 600. Here, the second relief valve 610 may have a preset pressure that is greater than the atmospheric pressure and less than that of the first relief valve 420. Thus, the gas may be continuously injected into the producing tank 500 until a concentration of carbon dioxide reaches a preset concentration.

A pressing passage 460 may be disposed between the gas supply passage 450 and the exhaust passage 600 to connect the gas supply passage 450 to the exhaust passage 600. Also, a pressing valve 461 may be provided in the pressing passage 460 to supply a carbon dioxide gas within the gas cylinder 300 into the producing tank 500 through the exhaust passage 600.

Also, a water level detection device 510 that is provided as a capacitive sensor to detect a water level within the producing tank 500 may be provided on an outer surface of the producing tank 500. Also, the water level detection device 510, the gas valve 430, the water supply valve 710, the dispensing valve 820, and the exhaust valve 620 may be connected to the controller 900, and thus, operations of the water level detection device 510, the gas valve 430, the water supply valve 710, the dispensing valve 820, and the exhaust valve 620 may be controlled by the controller 900.

A process of producing carbonated water in the apparatus for producing the carbonated water in the refrigerator having the above-described structure according to another implementation will be described below.

First, when a water level within a producing tank 500, which is detected by a water level detection device 510, does not reach a full level, cold water is supplied from a storage tube 210. For this, a switching valve 530 may be switched to allow a water supply passage 700 to communicate with a connection passage 520. Thus, the water supply valve 710 may be opened to supply the cold water into the producing tank 500.

Here, backflow of the cold water in the producing tank 500 or the connection passage 520 may be prevented by a check valve 431 provided in a gas supply passage 450. Also, an exhaust valve 620 may be opened to prevent a pressure within the producing tank 500 from increasing when the cold water is supplied so that the cold water is smoothly supplied. Also, a gas may be supplied into the producing tank 500 in a state where a pressing valve 461 is closed.

When the water level within the producing tank 500 reaches the full level, the exhaust valve 620 and the switching valve 620 may be closed. Then, the gas valve 430 may be opened to allow a gas within the gas cylinder 300 to be injected into a lower portion of the producing tank 500 through the connection passage 520 by successively passing through the gas regulator 410, the first relief valve 420, the gas valve 430, and the check valve 431. Here, a carbon dioxide gas injected into the producing tank 500 may be continuously injected for a preset time, and also, the gas valve 430 may be opened until a concentration of carbonated water within the producing tank 500 reaches a preset concentration.

When a pressure within the producing tank 500 is above a preset pressure of the second relief valve 610 while the carbon dioxide gas is injected into the producing tank 500, an increase in pressure within the producing tank 500 may be restricted by the second relief valve 610. That is, since the preset pressure of the second relief valve 610 is less than that of the first relief valve 420, when the carbon dioxide gas is injected, the preset pressure at which the carbonated water is easily produced may be maintained in the producing tank 500, and the carbon dioxide gas may be continuously injected.

When the gas valve 430 is opened for a preset time to complete the production of the carbonated water having a preset concentration, the switching valve 530 may connect the connection passage 520 to the dispensing passage 800. Also, the pressing valve 461 may be opened to inject the carbon dioxide gas into an upper portion of the producing tank 500 through the pressing passage 460.

Thus, the produced carbonated water may be dispensed into the dispenser 40 through the dispensing passage 800 and the dispensing valve 820, which are provided in the dispensing passage 800, by a pressure of the carbon dioxide gas that is injected into the producing tank 500.

Figure 14:
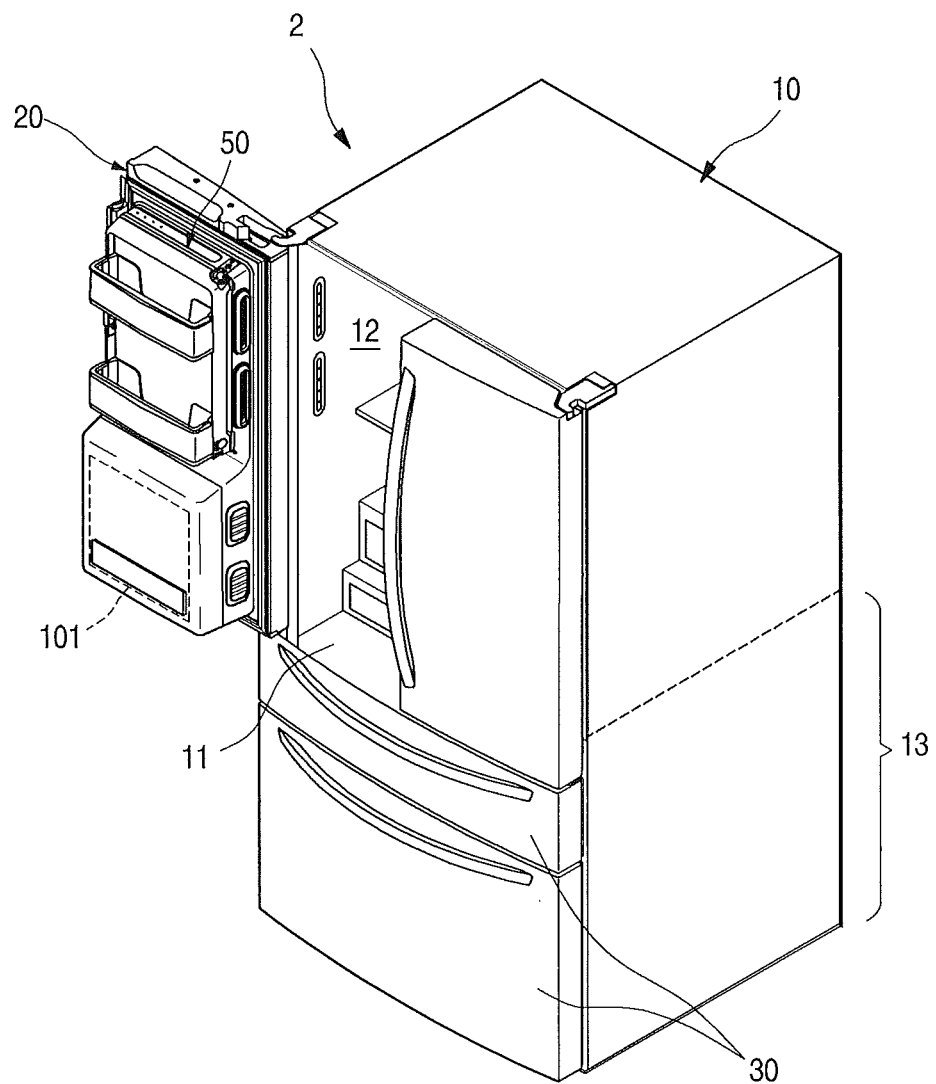
FIG. 14 is a perspective view of a refrigerator with the door opened in an opened position according to a fourth implementation.

Referring to FIG. 14, a refrigerator 1 according to an implementation includes a cabinet 10 defining a storage space and a door disposed on a front surface of the cabinet 10 to open and close the storage space. Here, an outer appearance of the refrigerator 1 may be defined by the cabinet 10 and the door.

The storage space within the cabinet 10 may be vertically partitioned by a barrier 11 to define a refrigerating compartment 12 at an upper side and a freezing compartment 13 at a lower side of the cabinet 10. Also, a plurality of shelves and drawers are disposed inside the freezing compartment 12 and the refrigerating compartment 13 to accommodate foods.

The door may include a refrigerating compartment door 20 for opening/closing the refrigerating compartment 11 and a freezing compartment door 30 for opening/closing the freezing compartment 12. The freezing compartment door 30 may be disposed on a front surface of the freezing compartment 13. The freezing compartment door 30 may be inserted into or withdrawn from the freezing compartment 13 like a drawer.

The freezing compartment 13 may be partitioned into vertical two compartments, and one of the upper and lower compartments may be used as the freezing compartment 13. Each of the upper and lower compartments may be adjusted in temperature and define an independent storage space. Thus, one compartment of the upper and lower compartments may be utilized as a storage space having a temperature higher than that of the freezing compartment 13. Also, the freezing compartment door 30 may be configured to independently withdraw each of the upper and lower compartments.

The refrigerating compartment door 20 may be provided in a pair on both left and right sides of a front surface of the refrigerating compartment 12. The pair of refrigerating compartment doors 20 may be independently rotatably mounted to open/close the refrigerating compartment 12. An ice making device for making and storing ice and a dispenser 40 for dispensing the ice made in the ice making device to the outside are provided in one of the pair of left and right refrigerating compartment doors 20.

The dispenser 40 may be provided in a front surface of the refrigerating compartment door 20 to dispense water or ice through the front surface of the refrigerating compartment door 20. For this, the dispenser 40 may be connected to an external water supply source, and a water purifying filter may be further provided in a passage. Also, the dispenser 40 may be configured to perform a dispensing member for dispensing carbonated water supplied from an apparatus 100 for producing the carbonated water (which will be described below in detail) as well as the ice and water.

The ice making device is accommodated into an ice making chamber 50 that is defined by recessing a door liner 21 disposed on a rear surface of the refrigerating compartment door 20. The ice making device may include an ice maker 51 for making ice and an ice bank 52 for storing the ice made in the ice maker 51. Also, the ice bank 52 may communicate with the dispenser 40 to dispense the ice within the ice bank 52 when the dispenser 40 is manipulated.

The ice making chamber 50 may be opened and closed by an ice making chamber door 53 to define an insulation space that is independent from the refrigerating compartment 12. Also, a separate basket 54 for accommodating may be provided in an outer surface of the ice making chamber door 53.

Figure 15:
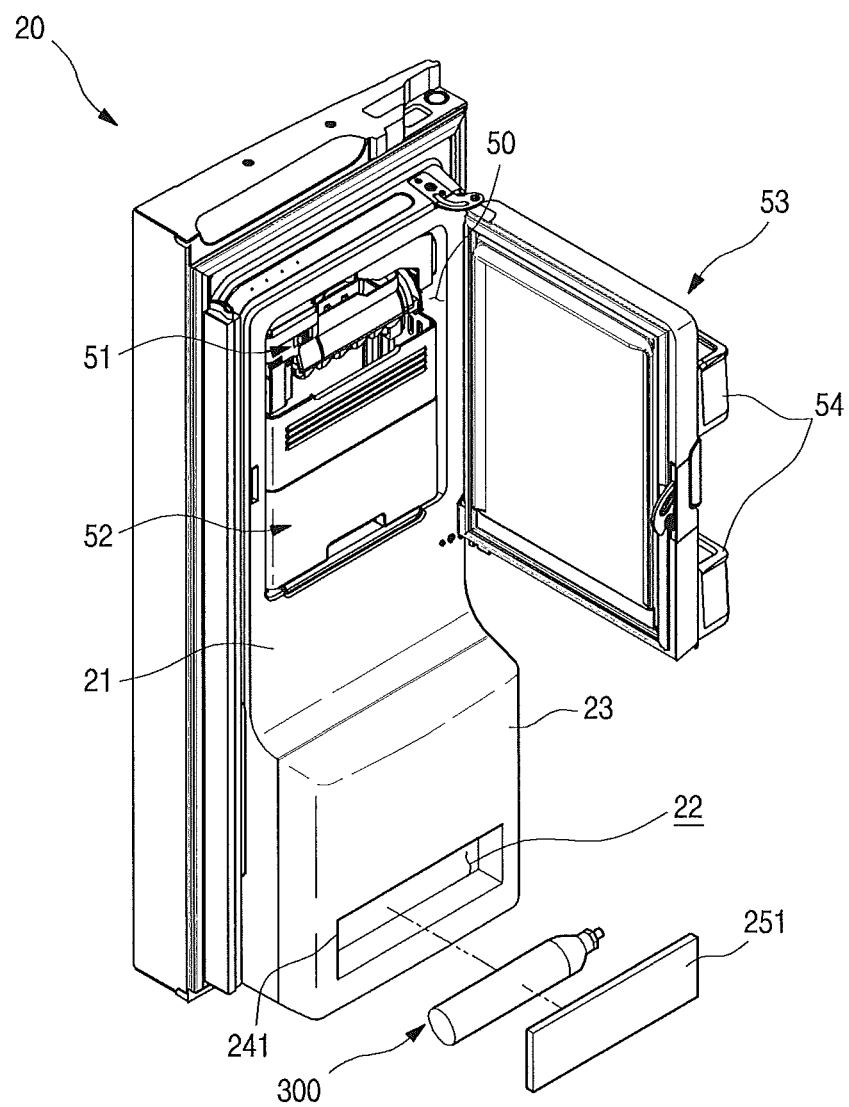
FIG. 15 is a perspective view illustrating a gas cylinder is mounted on the door of the refrigerator.

Referring to FIG. 15, the ice making chamber 50 is defined in an upper region of the rear surface of the refrigerating compartment door 20, and a space 22 in which the carbonated water producing apparatus 100 is disposed is defined below the ice making chamber 50, i.e., a lower region of the refrigerating compartment door 20.

In detail, the carbonated water producing apparatus 100 may also be disposed inside a space that is defined by recessing the door liner 21 defining the rear surface of the refrigerating compartment door 20. The space in which the carbonated water producing apparatus 100 is mounted may be opened and closed by a separate cover 23.

Also, a lower portion of the refrigerating compartment door 20, in which the carbonated producing apparatus 100 is disposed may further protrude from the ice making chamber 50 and the ice making chamber door 53 to provide the space 22 in which the carbonated water producing apparatus 100 is accommodated. Here, the lower portion of the refrigerating compartment door 200 may not interfere with shelves or drawers within the refrigerating compartment 12 in a state where the refrigerating compartment door 20 is closed.

The carbonated water producing apparatus 100 may include a gas cylinder 300 in which carbon dioxide gas is stored, a mixing unit 340 in which gas and water supplied from the gas cylinder 300 are mixed with each other to produce the carbonated water, various valves disposed in passages connecting the gas cylinder 300, the mixing unit 340, and the dispenser to each other, and a controller 60 for controlling electronic components the valves and the like.

Also, the gas cylinder 300 may be exposed to the outside through an opening 24 defined in the rear surface of the refrigerating compartment door 20. The gas cylinder 300 may be easily displaced and detached by a user. Here, a cylinder cover 25 may be further disposed on the opening 24 through which the gas cylinder 300 is inserted or withdrawn. The opening 24 may be covered by the cylinder cover 25.

Figure 16:
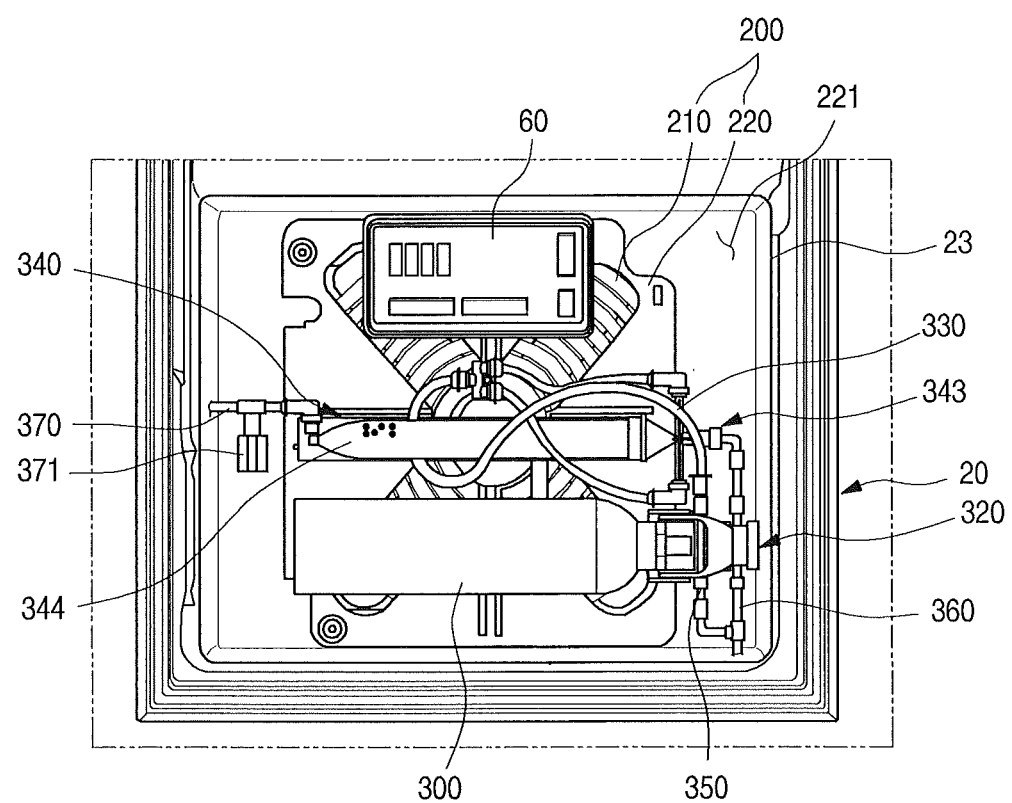
FIG. 16 is a view illustrating an apparatus for producing carbonated water mounted on the door of the refrigerator.
Figure 17:
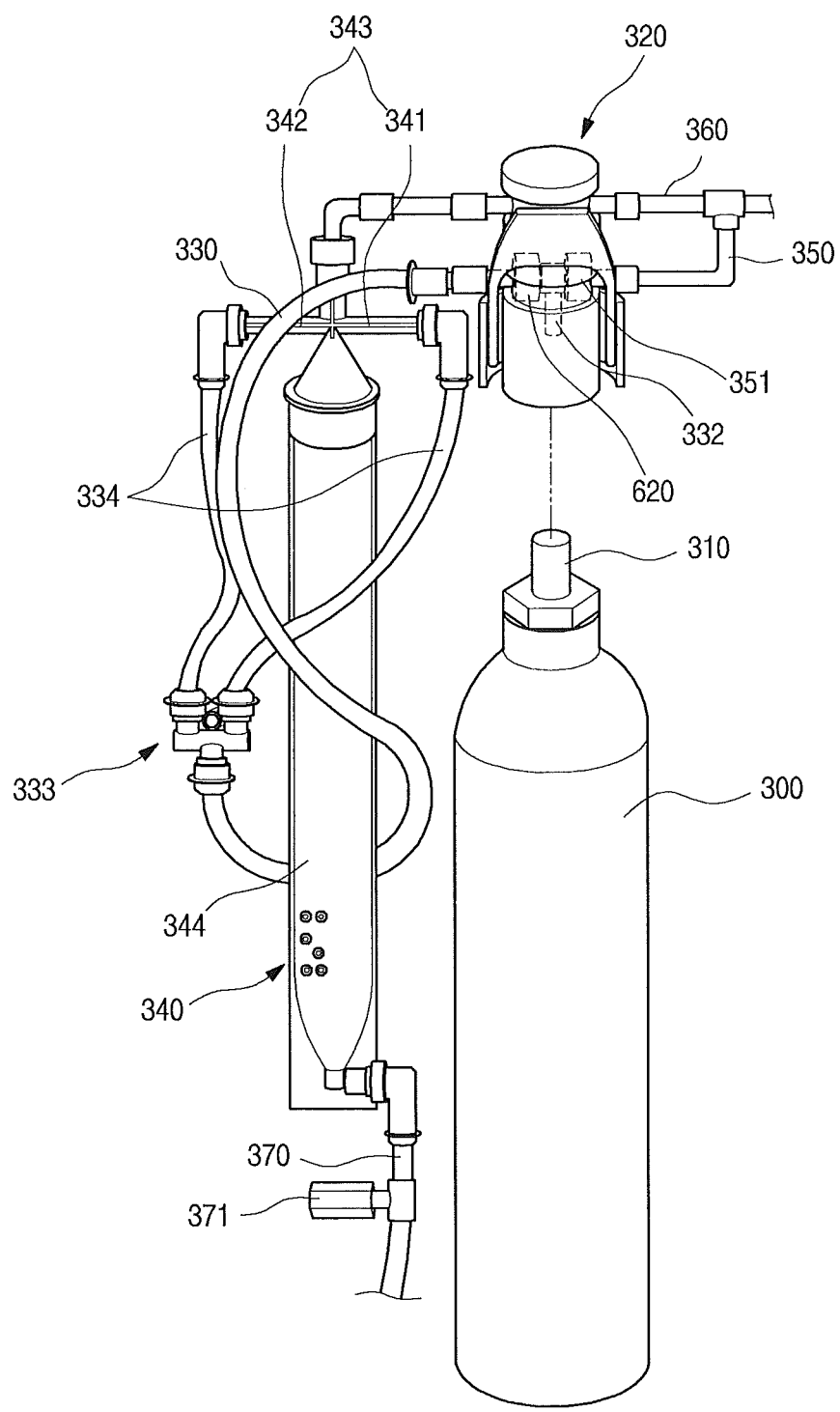
FIG. 17 is a view of the apparatus for producing the carbonated water.
Figure 18:
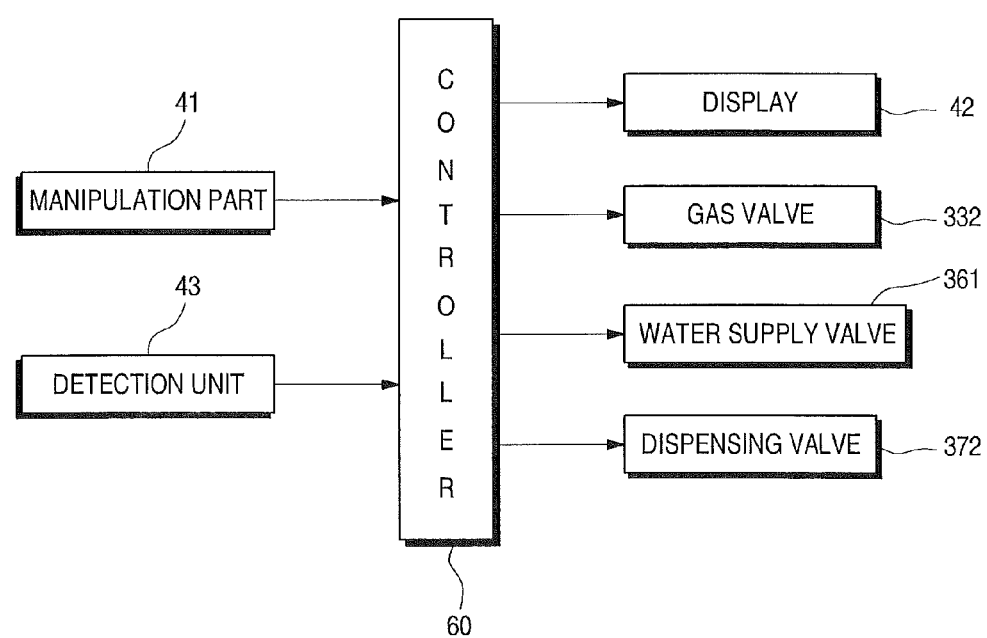
FIG. 18 is a block diagram illustrating a flow of a signal for controlling a valve constituting the apparatus for producing the carbonated water.

Referring to FIGS. 16 to 18, the carbonated water producing apparatus 100 is disposed in the space 22 defined by the door liner 21. Here, a water tank 200 may be disposed in the innermost portion of the space 22, and the apparatus 100 for producing the carbonated water, which is connected to the water tank 200, may be disposed at a front side of the water tank 200.

The water tank 200 may include a storage tube 210 in which water is stored and a mounting member 220 on which the storage tube 210 is mounted. The storage tube 210 has a tube shape connected to the water supply source to store water supplied from the water supply source.

The storage tube 210 may be disposed to be continuously wound around the mounting member 220. Here, the storage tube may be continuously wound in a circular shape with respect to one side thereof. Thus, the storage tube 210 may have a slim circular plate shape on the whole in the state where the storage tube 210 is wound.

The mounting member 220 may support the storage tube 210 so that the storage tube 210 is wound, and also, the wound storage tube is fixed to an inner wall of the space 22 in which the carbonated water producing apparatus 100 is mounted.

The water tank 200 may have a cylindrical or container shape, but does not have a tube shape. In addition, the water tank 200 may have a different shape that is capable of being installed in the space of the refrigerating compartment door 20.

Also, a water supply valve 361 may be disposed in the water tank 200. The water supply valve 361 may be disposed between a water supply source and the water tank 200 to supply water into the water tank 200.

The space in which the storage tube 210 is accommodated may communicate with the refrigerating compartment 12. Thus, the inside of the space 22 and the storage tube 210 may be cooled by introduction of cool air circulated in the refrigerating compartment 12. Thus, the water stored in the storage tube 210 may be supplied into the mixing unit 340 in a state where the water is cooled.

The water tank 200 may be connected to each of the passages so that the water is dispensed through the dispenser 40 or supplied into the ice maker 51. Here, a valve may be provided in each of the passages.

The carbonated water producing apparatus 100 is disposed at a front side of the water tank 200 and connected to the gas cylinder 300, the mixing unit 340, and the plurality of valves through the passages.

In more detail, the gas cylinder 300 may be a container in which the carbon dioxide gas is stored and be detachably disposed on the carbonated water producing apparatus 100. For this, a connection tool 310 may be connected to an upper end of the gas cylinder 300. When the connection tool 310 is connected, the carbon dioxide gas within the gas cylinder 300 may be discharged.

Also, the carbon dioxide gas may be injected and charged into the gas cylinder 300 through the connection tool 310. As described above, the gas cylinder 300 may be used as the gas cylinder 300 for producing the carbonated water, which is commonly used. That is, the existing product may be used as the gas cylinder 300.

A head unit 320 may be detachably disposed on the gas cylinder 330. When the gas cylinder 300 is mounted on the head unit 320, the gas cylinder 300 may be connected to the gas supply passage for supplying the carbon dioxide gas.

The inside of the head unit 320 may be provided in a screw type or quick coupling type so that the head unit 320 is connected to a connection tool 310 of the gas cylinder 300. Also, the gas supply passage 330 and the water supply passage 360 may pass through the head unit 320.

That is, the head unit 320 may be provided in the form of a module. The gas cylinder 300 may be connected to the head unit 320, and the water supply passage 360 and the gas supply passage 330 may be connected to the head unit 320 to form a passage. Alternatively, an independent passage that does not pass through the head unit 320 may be defined in the water supply passage 360.

Also, a gas valve 331 may be provided in the head unit 320. The gas supply passage 330 and the pressing passage 350 may be connected to each other by the gas valve 331. That is, as the gas valve 331 is opened, the carbon dioxide gas discharged from the gas cylinder 300 may be supplied into the gas supply passage 330 and the pressing passage 350.

The gas supply passage 330 may connect the gas cylinder 330 to the mixing unit 340 to supply the carbon dioxide gas of the gas cylinder 300 into the mixing unit 340. Also, a gas regulator 332 may be provided in the gas supply passage 330.

The gas regulator 332 is configured to discharge the carbon dioxide gas discharged from the gas cylinder 300 at a predetermined pressure. Thus, the carbon dioxide gas may be supplied into the mixing unit 340 at the predetermined pressure.

Also, the gas supply passage 330 passing through the gas regulator 332 may be branched into a pair of left and right gas branch passages 334 by a gas branch tube 333. The gas branch passage 334 may be connected to a gas supply part 341 of a mixing branch tube 343 that will be described below.

The pressing passage 350 connected to the gas valve 331 may be configured to supply the water supplied into the mixing unit 340 at a predetermined pressure. The pressing passage 350 may connect the gas valve 331 to the water supply passage 360.

A pressing regulator 351 for uniformly maintaining a pressure of the carbon dioxide gas supplied into the water supply passage 360 may be provided in the pressing passage 350. The water flowing the water supply passage 360 may flow at a predetermined pressure by the pressing regulator 351. Here, the pressing regulator 351 may have a preset pressure of at least 2.5 $Kgf/cm^2$ so that the water is smoothly mixed with the carbon dioxide gas.

The water supply passage 360 may connect the water tank 200 to the mixing unit 340. Also, the water supply passage 360 may be connected to a water supply part 342 of the mixing branch part 343 via the head unit 320.

The mixing unit 340 may be configured to produce carbonated water while the water and the carbon dioxide gas are introduced and mixed with each other to flow. Thus, the mixing unit 340 may be called a carbonator.

The mixing unit 340 may include a mixing branch tube 343 to which the water supply passage 360 and the gas supply passage 330 are connected and a mixing part 344 in which the water and carbon dioxide gas introduced through the mixing branch tube 343 are mixed with each other to flow.

The mixing branch tube 343 may include a gas supply part 341 disposed in a horizontal direction and a water supply part 342 disposed to cross the gas supply part 341. The gas supply part 341 may have both left and right ends that are respectively connected to the gas branch passages 334 branched from the gas supply passage 330. The water supply passage 360 may be connected to the water supply part 342.

The inside of each of the gas supply part 341 and the water supply part 342 may be provided as a tube having a small inner diameter. Here, the tubes may cross each other. Also, a lower portion of the tube between the gas supply part 341 and the water supply part 342 may be expanded and connected to the mixing part 344.

Thus, the water introduced at a predetermined pressure from the water supply part 342 through the water supply passage 360 may pass through a point, at which the water supply part 342 and the gas supply part 341 cross each other, at a quick speed by the carbon dioxide gas supplied through the pressing passage 350. Thus, the carbon dioxide gas may be introduced through an end of the gas supply part 341 in a state where the gas becomes to a low pressure state in a moment by the flow velocity of the water to mix the water with the carbon dioxide.

That is, the water and the carbon dioxide gas may be effectively mixed with each other by a change in pressure due to the flow velocity of the water without applying an additional power. Thus, the water and the carbon dioxide gas may be introduced into the mixing part 344 in the state where the water and the carbon dioxide gas are mixed with each other.

Also, the mixing part 344 has a vertically long cylinder shape. The water and the carbon dioxide gas may react with each other in the mixing part while flows in the mixed state to produce carbonated water.

A dispensing passage may be connected to a lower portion of the mixing part 344. The dispensing passage 370 may be connected to the dispenser 40 to dispense the carbonated water through the dispenser 40. Also, a dispensing regulator 371 may be provided in the dispensing passage 370.

The dispensing regulator may be configured to uniformly maintain a pressure of the dispensed carbonated water. Thus, the carbonated water that is maintained at a preset pressure may be discharged while being maintained at an adequate concentration.

In explaining preset pressures of the pressing regulator 351, the gas regulator 332, and the dispensing regulator 371, the pressing regulator 351 may have the highest pressure, and the dispensing regulator 371 may have a pressure between the pressure of the pressing regulator 351 and the pressure of the gas regulator 332. That is, the preset pressures of the regulators may be set to increase in order of the pressing regulator 351, the dispensing regulator 371, and the gas regulator 332.

Thus, the water may be supplied at the preset pressures at which the carbonated water is effectively produced. The region in which the pressure regulator 351 has the highest pressure is for supplying the water into the mixing unit at a pressure of about 2.5 Kgf/cm$^2$ or more at which the carbonated water is effectively produced. Also, the carbon dioxide gas may be supplied into the mixing unit 340 at a pressure that is relatively less than that of the water to efficiently mix the water with the carbon dioxide gas. Furthermore, since the preset pressure of the dispensing regulator 371 is greater than that of the gas regulator 332, the water and the carbon dioxide gas may be mixed with each other for a sufficient mixing time and then be disposed through the dispensing passage 370.

The dispensing passage 370 may be connected to a nozzle of the dispenser 40 to selectively supply the cold water and the carbonated water. Alternatively, the dispensing passage 370 may be connected to a separate valve to selectively dispense the cold water and the carbonated water. Alternatively, a nozzle for dispensing the cold water and a nozzle for dispensing the carbonated water may be separately provided to the dispenser 40.

Hereinafter, a process of producing the carbonated water in the refrigerator including the above-described constitutions and a process of dispensing the carbonated water will be described below.

Figure 19:
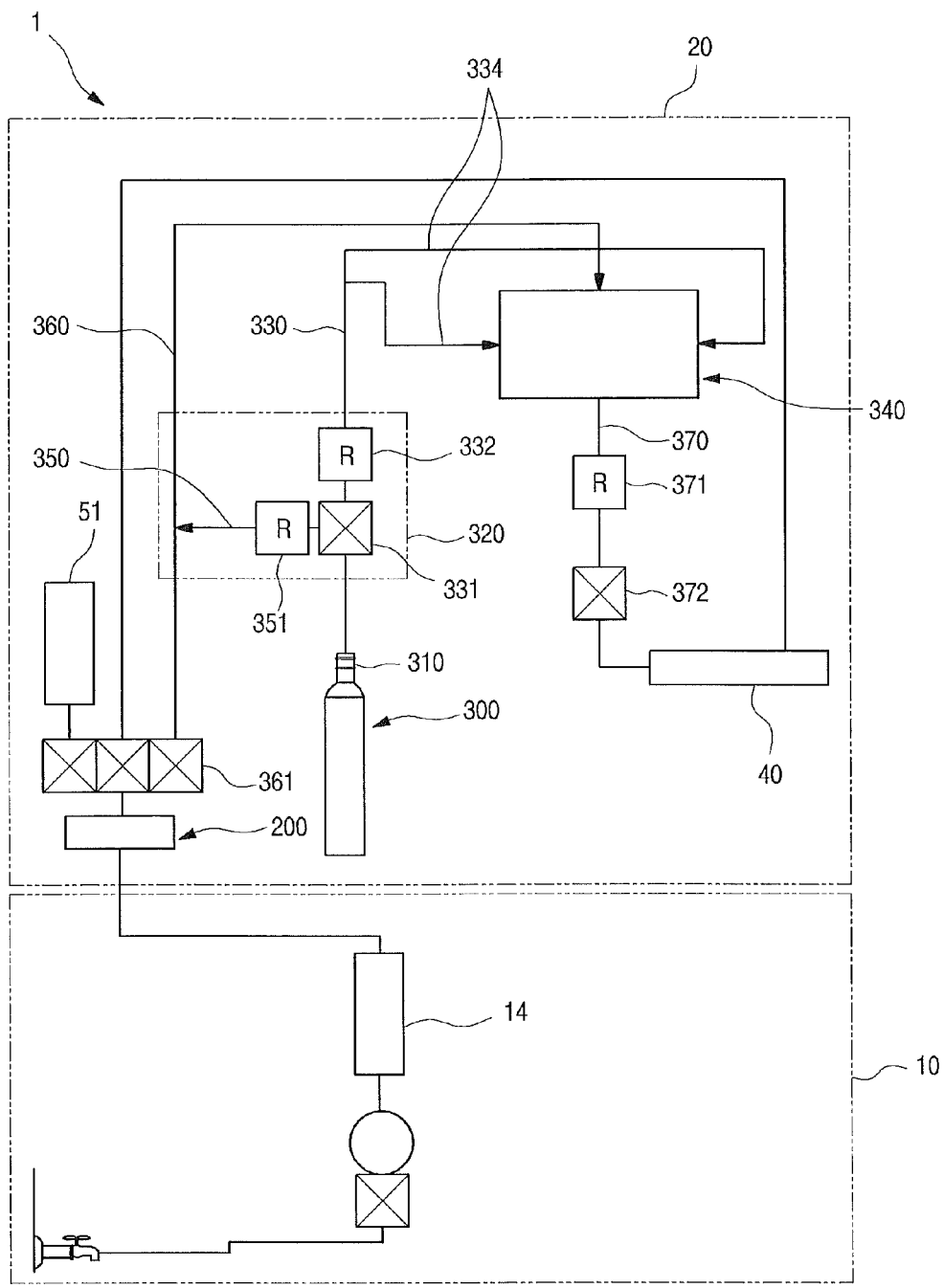
FIG. 19 is a schematic view illustrating a process of producing carbonated water and a path for discharging the carbonated water in the apparatus for producing the carbonated water.

As illustrated in FIG. 19, water supplied from a water supply source may be purified in a filter 14 and then be maintained in a state in which the purified water is stored in a water tank 200. The water stored in the water tank 200 may be cooled by cool air of a refrigerating compartment 12 and then be maintained in the cold state.

Also, the cold water may be supplied into an ice maker 51, a dispenser 40, and an apparatus 100 for producing carbonated water to make ice or dispense the cold water or carbonated water.

When a manipulation part 41 of the dispenser 40 is manipulated by a user so as to dispense the carbonated water, a controller 60 may receive a signal for producing the carbonated water. When the signal for producing the carbonated water is inputted, a water supply valve 361 and a gas valve 331 may be opened.

When the water supply valve 361 is opened, the water within the water tank 200 may be introduced into a water supply part 342 of a mixing unit 340 through a water supply passage 360. Also, when the gas valve 331 is opened, a carbon dioxide gas within a gas cylinder 300 may flow into a pressing passage 350 and a gas supply passage 330.

A portion of the carbon dioxide gas supplied into the pressing passage 350 may be supplied into the water supply passage 360 at a pressure that is set by a pressing regulator 351. Thus, the water supplied into the mixing unit 340 through the water supply passage 360 may be supplied into the mixing unit 340 while being maintained at a predetermined pressure.

Also, when the gas valve 331 is opened, the carbon dioxide gas discharged from the gas cylinder 300 may flow along the gas supply passage 330 and then be divided by a gas branch passage 334 to flow into the mixing unit 340 through the gas supply parts 341 that are disposed at both left and right sides.

Here, the carbon dioxide gas flowing through the gas supply passage 330 may be supplied at a predetermined pressure by the gas regulator 332 that is set to a pressure less than that of the pressing regulator 351. Thus, the carbon dioxide gas supplied through the gas supply passage 330 may be mixed in the mixing unit 340 by the high velocity water that is introduced at a high pressure.

The water and the carbon dioxide gas which are mixed with each other in the mixing unit 340 may react with each other while flowing along the mixing unit 340 and be discharged into the dispensing passage 370 through the opened dispensing valve at a predetermined pressure by the dispensing regulator 371 having the preset pressure. Here, the preset pressure of the dispensing regulator 371 may be greater than that of the gas regulator 332 and less than that of the pressing regulator 351. Thus, the water and the carbon dioxide gas may be discharged after sufficiently reacting with each other in the mixing unit 340.

The carbonated water discharged into the dispensing passage 370 through the above-described processes may be discharged through the nozzle of the dispenser 40.

A display 42 may display the carbonated water dispensing manipulation or state. As necessary, a usage amount of gas dispensed from the gas cylinder 300 may be detected by a detection unit 43 such as a pressure sensor and a timer to display a replacing time for the gas cylinder 300 on the display 42 or display an unavailable state in producing of the carbonated water on the display 42.

For example, a refrigerator according to another implementation is characterized in that a separate water tank for producing carbonated water in addition to a water tank for storing water that is used for supplying cold water into an ice maker and a dispenser is further provided.

Figure 20:
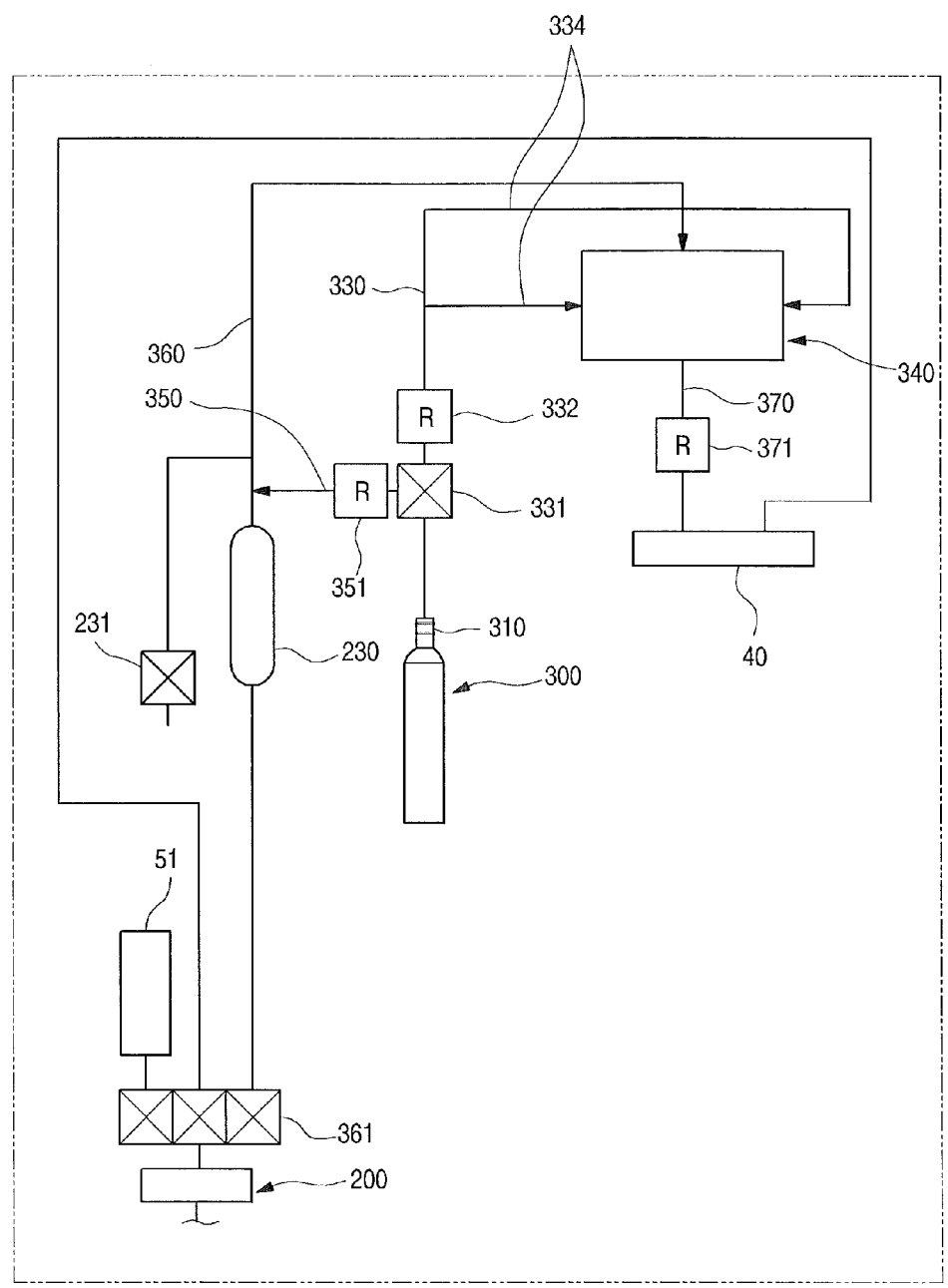
FIG. 20 is a schematic view illustrating a process of producing carbonated water and a path for discharging the carbonated water in an apparatus for producing the carbonated water according to a fifth implementation.

Referring to FIG. 20, an apparatus 100 for producing carbonated water according to an implementation may further include a water tank 230 for carbonated water in addition to a gas cylinder 300 and a mixing unit 340.

The water tank 230 for the carbonated water may be connected to a water tank 200 connected to an ice maker 51 and a dispenser 40 so that water is supplied into the water tank 230 for the carbonated water by an operation of a water supply valve 361.

That is, the water for producing the carbonated water may be independently supplied by the water tank 230 for the carbonated water. When the dispensing of the carbonated water is manipulated by a user, a water supply valve 361 may be opened to supply the water.

Also, an exhaust passage and an exhaust valve 231 may be disposed between a pressing passage 350 and the water tank 230 for the carbonated water. The water may be smoothly supplied into the water tank 230 for the carbonated water by the exhaust valve 231, and a carbon dioxide gas may be smoothly supplied in the pressing passage 350 for pressing.

That is, when the water is supplied into the water tank 230 for the carbonated water, the exhaust valve 231 and the water supply valve 361 may be opened to supply the water within the water tank 200. When the carbonated water is dispensed, the water supply valve 361 may be closed, and the exhaust valve 231 and the gas valve 331 may be opened.

Thus, when the carbonated water is dispensed, the carbon dioxide gas supplied through the pressing passage 350 may allow the water to be supplied into a mixing unit 340 at a preset pressure, allow the carbon dioxide gas supplied through a gas supply passage 330 to be mixed with the water in the mixing unit 340, and allow the mixture of the water and the carbon dioxide gas to be dispensed into the dispenser 40 through a dispensing passage 370.

The components that do not described in detail may be equal to those according to the forgoing implementations, and thus, their detailed descriptions will be omitted, and also the same reference numeral will be used.

According to the apparatus for producing the carbonated water and the refrigerator including the same and a method for controlling the same, following effects may be expected.

The first relief valve having the preset pressure may be provided in the passage for supplying the carbon dioxide gas into the producing tank, and the second relief valve having the preset pressure that is greater than the atmospheric pressure and less than that of the first relief valve may be provided in the upper portion of the producing tank.

Also, when the carbon dioxide gas is injected, the producing tank may be maintained at a predetermined pressure at which the carbonated water is easily produced. Particularly, even through the carbon dioxide gas is continuously supplied, the inner pressure of the producing tank may be maintained at a predetermined pressure, at which the carbonated water is easily produced, by the second relief valve.

Thus, the carbonated water within the producing tank may reach a desired concentration by being injected only once. Thus, the time for producing the carbonated water may be significantly reduced.

At the same time, although the carbon dioxide gas is injected for a long time, the inner pressure of the storage tank may be maintained at the optimal pressure at which the carbonated water is easily produced. Also, the producing tank, the various passages, the valves may be stably fitted without causing leakage of the carbon dioxide gas.

Also, since the water level detection device for detecting the water level within the producing tank is disposed outside the producing tank, a separate punching process may not be performed on the producing tank. Also, the number of passages passing through the producing tank may be minimized as the gas supply passage, the exhaust passage, and the connection passage to minimize the number of portions at which the possibility of the leakage in the producing tank exists, thereby improving operation reliability and durability.

Also, the cold water storage unit that is necessary for producing the carbonated water may be accommodated into the same space as the apparatus for producing the carbonated water to minimize a length of the passage. Thus, the leakage and losses of the carbon dioxide gas may be minimized to improve producing performance of the carbonated water.

Also, according to the apparatus for producing the carbonated water and the refrigerator including the same, when the carbonated water is dispensed, the supply and mixing of the carbon dioxide and the water may be immediately performed to produce the carbonated water even though a carbonated water tank for injecting the carbon dioxide in a state where the water is stored is not provided. Therefore, the loss of the storage space of the refrigerator may be minimized.

Also, since a portion of the gas supplied from the gas cylinder is divided in the water supply passage and then supplied, the water may be supplied at a predetermined pressure without using a separate pumping device. Also, the carbonated water having the uniform concentration may be supplied.

As described above, since the carbonated water tank and the pump are omitted, the whole structure of the apparatus for producing the carbonated water may be simplified and compact. Therefore, the installation space of the apparatus for producing the carbonated water may be minimized to reduce the manufacturing costs and improve the productivity. In addition, the loss of the storage space of the refrigerator may be minimized.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for producing carbonated water, the apparatus comprising:
    a gas cylinder configured to store carbon dioxide gas;
    a cold water storage unit configured to store cold water;
    a producing tank defining a closed space where the carbonated water is produced;
    a water supply passage configured to connect the cold water storage unit to the producing tank, the water supply passage comprising a water supply valve that controls supply of the cold water;
    a gas supply passage connecting the gas cylinder to the producing tank, the gas supply passage comprising a gas valve that controls supply of the carbon dioxide;
    a first relief valve provided along the gas supply passage, the first relief valve configured to control the discharge of the carbon dioxide gas;
    a dispensing passage connecting the producing tank to a dispensing member;
    the dispensing member configured to dispense the carbonated water from a front surface of a refrigerator, the dispensing passage comprising a dispensing valve that controls flow of the carbonated water;
    a second relief valve in communication with an upper portion of the producing tank, the second relief valve configured to control discharge of air within the producing tank; and
    a controller configured to control operation of the first relief valve and the second relief valve, wherein the controller is configured to control the gas valve to remain in an opened position until the carbonated water in the producing tank meets a preset concentration,
    wherein the second relief valve is configured to have a preset pressure that is greater than the atmospheric pressure and less than the pressure of the first relief valve, and wherein the carbon dioxide gas is continuously injected into the producing tank based on the second relief valve being oriented in an opened position, wherein the second relief valve is provided in the producing tank.

2. The apparatus according to claim 1, further comprising an exhaust passage connected to an upper portion of the producing tank and comprising an exhaust valve that controls exhaust of air within the producing tank,
    wherein the second relief valve is provided in the exhaust passage.

3. The apparatus according to claim 1, further comprising one or more regulator configured to maintain pressure of the supplied carbon dioxide and the dispensed carbonated water, at least one of the one or more regulators being provided in each of the gas supply passage and the dispensing passage.

4. The apparatus according to claim 1, further comprising an injection nozzle that is configured to inject the carbon dioxide gas and that is provided on a first end of the gas supply passage,
   wherein the injection nozzle is positioned to be immersed in the cold water based on the cold water of the producing tank being at a full level state.

5. The apparatus according to claim 1, further comprising a water level detection device provided on an outer surface of the producing tank,
   wherein the water level detection device is configured to detect a variation in capacitance to detect a water level within the producing tank.

6. An apparatus for producing carbonated water, the apparatus comprising:
   a gas cylinder configured to store carbon dioxide gas;
   a cold water storage unit configured to store cold water;
   a producing tank defining a closed space where the carbonated water is produced;
   a water supply passage configured to connect the cold water storage unit to the producing tank, the water supply passage comprising a water supply valve that controls supply of the cold water;
   a gas supply passage connecting the gas cylinder to the producing tank, the gas supply passage comprising a gas valve that controls supply of the carbon dioxide;
   a first relief valve provided along the gas supply passage, the first relief valve configured to control the discharge of the carbon dioxide gas;
   a dispensing passage connecting the producing tank to a dispensing member;
   a connection passage that is in communication with the producing tank and that is provided in a lower portion of the producing tank;
   the dispensing member configured to dispense the carbonated water from a front surface of a refrigerator, the dispensing passage comprising a dispensing valve that controls flow of the carbonated water;
   a second relief valve in communication with an upper portion of the producing tank, the second relief valve configured to control discharge of air within the producing tank; and
   a controller configured to control operation of the first relief valve and the second relief valve, wherein the controller is configured to control the gas valve to remain in an opened position until the carbonated water in the producing tank meets a preset concentration,
   wherein the second relief valve is configured to have a preset pressure that is greater than the atmospheric pressure and less than the pressure of the first relief valve, and wherein the carbon dioxide gas is continuously injected into the producing tank based on the second relief valve being oriented in an opened position,
   wherein the connection passage, the water supply passage, and the dispensing passage are connected to a switching valve configured to selectively connect the passages to each other.

7. An apparatus for producing carbonated water, the apparatus comprising:
   a gas cylinder configured to store carbon dioxide gas;
   a cold water storage unit configured to store cold water;
   a producing tank defining a closed space where the carbonated water is produced;
   a water supply passage configured to connect the cold water storage unit to the producing tank, the water supply passage comprising a water supply valve that controls supply of the cold water;
   a gas supply passage connecting the gas cylinder to the producing tank, the gas supply passage comprising a gas valve that controls supply of the carbon dioxide;
   a first relief valve provided along the gas supply passage, the first relief valve configured to control the discharge of the carbon dioxide gas;
   a dispensing passage connecting the producing tank to a dispensing member;
   a connection passage that is in communication with the producing tank and that is provided in a lower portion of the producing tank;
   the dispensing member configured to dispense the carbonated water from a front surface of a refrigerator, the dispensing passage comprising a dispensing valve that controls flow of the carbonated water;
   a second relief valve in communication with an upper portion of the producing tank, the second relief valve configured to control discharge of air within the producing tank; and
   a controller configured to control operation of the first relief valve and the second relief valve, wherein the controller is configured to control the gas valve to remain in an opened position until the carbonated water in the producing tank meets a preset concentration,
   wherein the second relief valve is configured to have a preset pressure that is greater than the atmospheric pressure and less than the pressure of the first relief valve, and wherein the carbon dioxide gas is continuously injected into the producing tank based on the second relief valve being oriented in an opened position,
   wherein the producing tank is injection-molded using a plastic material to define a space therein.

8. An apparatus for producing carbonated water, the apparatus comprising:
   a gas cylinder configured to store carbon dioxide gas;
   a cold water storage unit configured to store cold water;
   a producing tank defining a closed space where the carbonated water is produced;
   a water supply passage configured to connect the cold water storage unit to the producing tank, the water supply passage comprising a water supply valve that controls supply of the cold water;
   a gas supply passage connecting the gas cylinder to the producing tank, the gas supply passage comprising a gas valve that controls supply of the carbon dioxide;
   a first relief valve provided along the gas supply passage, the first relief valve configured to control the discharge of the carbon dioxide gas;
   a dispensing passage connecting the producing tank to a dispensing member;
   a connection passage that is in communication with the producing tank and that is provided in a lower portion of the producing tank;
   the dispensing member configured to dispense the carbonated water from a front surface of a refrigerator, the dispensing passage comprising a dispensing valve that controls flow of the carbonated water;
   a second relief valve in communication with an upper portion of the producing tank, the second relief valve configured to control discharge of air within the producing tank; and a controller configured to control operation of the first relief valve and the second relief valve, wherein the controller is configured to control the gas valve to remain in an opened position until the carbonated water in the producing tank meets a preset concentration, wherein the second relief valve is configured to have a preset pressure that is greater than the atmospheric pressure and less than the pressure of the first relief valve, and wherein the carbon dioxide gas is continuously injected into the producing tank based on the second relief valve being oriented in an opened position, wherein the connection passage, the water supply passage, and the dispensing passage are connected to a switching valve configured to selectively connect the passages to each other, and wherein the gas supply passage is connected to the connection passage between the switching valve and the producing tank.

9. The apparatus according to claim 8, further comprising a check valve, which is configured to prevent the carbonated water from flowing in a reverse direction, into the gas supply passage.

10. The apparatus according to claim 8, further comprising a pressing passage that connects the gas supply passage to an upper portion of the producing tank, wherein the pressing passage is opened to allow the carbon dioxide gas to be injected into the producing tank based on the carbonated water being dispensed.

11. The apparatus according to claim 10, further comprising an exhaust passage connected to an upper portion of the producing tank and comprising an exhaust valve, wherein the exhaust valve is configured to control the exhaust of air within the producing tank, and wherein the pressing passage is connected to the exhaust passage.

12. A refrigerator comprising an apparatus for producing carbonated water, the refrigerator comprising:

a cabinet that defines a refrigerating compartment and a freezing compartment;

a door that is configured to open and close at least a portion of the cabinet;

a dispenser mounted to a front surface of the door;

a cold water storage unit provided in the door, the cold water storage unit configured to be cooled by cool air of the refrigerating compartment; and an apparatus for producing the carbonated water, the apparatus mounted to the door, the apparatus configured to mix cold water from the cold water storage unit with a carbon dioxide gas and supply the mixture to the dispenser, wherein the apparatus for producing the carbonated water comprises:

a gas cylinder detachably mounted to the door and configured to store carbon dioxide gas;

a producing tank connected to the gas cylinder, the cold water storage unit, and the dispenser by one or more connection passages, the producing tank defining a closed space where the carbonated water is produced;

a plurality of valves provided in the one or more connection passages, and configured to open and close the one or more connection passages;

a first relief valve provided along the passage configured to supply the carbon dioxide gas into the producing tank, the first relief valve configured to control discharge of the carbon dioxide gas when the supplied carbon dioxide gas has a pressure greater than a preset pressure;

a second relief valve in communication with an upper portion of the producing tank, the second relief valve configured to have a preset pressure that is greater than the atmospheric pressure and less than that of the first relief valve; and a controller configured to control the first relief valve and the second relief valve so that the carbon dioxide gas is continuously supplied until the carbonated water within the producing tank meets a preset concentration, wherein the cold water storage unit and the apparatus for producing the carbonated water are accommodated into a recessed space of a door liner defining a back surface of the door, wherein the recessed space is covered by a detachable cover.

13. The refrigerator according to claim 12, further comprising an ice making chamber that is configured to make ice, that is disposed in an upper portion of the door, and that communicates with the dispenser, and wherein the apparatus for producing the carbonated water is disposed under the ice making chamber.

14. The refrigerator according to claim 12, wherein the recessed space is in communication with the refrigerating compartment to allow cool air to be introduced into the recessed space.

15. The refrigerator according to claim 12, further comprising an ice making chamber door configured to open and close the ice making chamber, and a basket disposed on the ice making chamber door and configured to define an accommodation space.

16. The refrigerator according to claim 12, further comprising an opening on which the gas cylinder is detached is defined in the cover at a position corresponding to the gas cylinder, and the refrigerator further comprises a cylinder cover configured to open and close the opening.

17. The refrigerator according to claim 12, wherein the cold water storage unit has a plate shape by winding a storage tube connected to a water supply source, and wherein the cold water storage unit is disposed at a rear side of the apparatus for producing the carbonated water.

18. A refrigerator comprising an apparatus for producing carbonated water, the refrigerator comprising:

a cabinet that defines a refrigerating compartment and a freezing compartment;

a door that is configured to open and close at least a portion of the cabinet;

a dispenser mounted to a front surface of the door;

a cold water storage unit provided in the door, the cold water storage unit configured to be cooled by cool air of the refrigerating compartment; and an apparatus for producing the carbonated water, the apparatus mounted to the door, the apparatus configured to mix cold water from the cold water storage unit with a carbon dioxide gas and supply the mixture to the dispenser, wherein the apparatus for producing the carbonated water comprises:

a gas cylinder detachably mounted to the door and configured to store carbon dioxide gas;

a producing tank connected to the gas cylinder, the cold water storage unit, and the dispenser by one or more connection passages, the producing tank defining a closed space where the carbonated water is produced;
a connection passage disposed in a lower portion of the producing tank
a plurality of valves provided in the one or more connection passages, and configured to open and close the one or more connection passages;
a first relief valve provided along the passage configured to supply the carbon dioxide gas into the producing tank, the first relief valve configured to control discharge of the carbon dioxide gas when the supplied carbon dioxide gas has a pressure greater than a preset pressure;
a second relief valve in communication with an upper portion of the producing tank, the second relief valve configured to have a preset pressure that is greater than the atmospheric 5 pressure and less than that of the first relief valve; and
a controller configured to control the first relief valve and the second relief valve so that the carbon dioxide gas is continuously supplied until the carbonated water within the producing tank meets a preset concentration,
wherein the connection passage is branched into a water supply passage connected to the cold water storage unit and a dispensing passage connected to the dispenser by a switching valve to allow the dispenser to selectively dispense the cold water and the carbonated water through the dispensing passage.

19. An apparatus for producing carbonated water, the apparatus comprising:
a water tank configured to store water for producing the carbonated water;
a water supply passage connected to a cold water storage unit to supply the water;
a gas cylinder configured to store a carbon dioxide gas;
a gas supply passage connected to the gas cylinder to supply the carbon dioxide gas;
a mixing unit connected to the water supply passage and the gas supply passage, and the mixing unit is configured to mix received water and carbon dioxide, wherein the carbon dioxide gas is introduced by a low pressure generated by a flow velocity of the water received;
a dispensing passage connected to the mixing unit configured to discharge the produced carbonated water; and
a pressing passage branched from the gas supply passage and connected to the water supply passage, the pressing passage configured to supply and press a portion of the gas within the gas supply passage so that the water supplied into the mixing unit is supplied at a predetermined pressure.

20. The apparatus according to claim 19, wherein a gas regulator for supplying the carbon dioxide gas into the mixing unit is disposed in the gas passage, and
a pressing regulator for supplying the carbon dioxide into the water supply passage is disposed in the pressing passage,
wherein the pressing regulator is set to a pressure greater than that of the gas regulator.

21. The apparatus according to claim 20, further comprising a dispensing regulator configured to dispense the carbonated water produced in the mixing passage is disposed in the dispensing passage, and
herein the dispensing regulator is set to a pressure between the pressure of the pressing regulator and the pressure of the gas regulator.

22. The apparatus according to claim 20, wherein the gas cylinder is detachably connected to a head unit in which a gas valve is configured to connect the pressing passage to the gas supply passage is disposed.

23. The apparatus according to claim 22, wherein the gas regulator and the pressing regulator are provided in the form of an assembly together with the head unit to connect the gas supply passage to the pressing passage.

24. The apparatus according to claim 19, wherein the gas supply passage is branched into a pair, and the pair of gas supply passages are connected to both sides of the mixing unit, respectively.

25. A refrigerator comprising an apparatus for producing carbonated water, the refrigerator comprising:
a cabinet defining a refrigerating compartment and a freezing compartment;
a door configured to open and close each of the refrigerating compartment and the freezing compartment;
an ice making chamber mounted to the door, and in which an ice maker is accommodated;
a dispenser for dispensing ice within the ice making chamber; and
the apparatus for producing the carbonated water, is accommodated in a space of a back surface of the door, the apparatus connected to the dispenser to produce and dispense the carbonated water,
wherein the apparatus for producing the carbonated water comprises:
a gas cylinder configured to store a carbon dioxide gas;
a mixing unit connected to a water tank for the carbonated water and the gas cylinder, and wherein the carbon dioxide gas is introduced by a low pressure generated by flow velocity of introduced water to produce the carbonated water;
a water supply passage configured to connect the water tank for the carbonated water to the mixing unit;
a gas supply passage configured to connect the gas cylinder to the mixing unit;
a dispensing passage configured to connect the mixing unit to the dispenser; and
a pressing passage branched from the gas supply passage and connected to the water supply passage, the pressing passage configured to supply and press a portion of the gas within the gas supply passage so that the water supplied into the mixing unit is supplied at a predetermined pressure.

26. The refrigerator according to claim 25, wherein a gas regulator configured to supply the carbon dioxide gas at a predetermined pressure into the mixing unit is disposed in the gas passage, and
a pressing regulator configured to supply the carbon dioxide gas at a predetermined pressure into the water supply passage is disposed in the pressing passage,
wherein the pressing regulator is set to a pressure greater than that of the gas regulator.

27. The refrigerator according to claim 25, wherein a dispensing regulator configured to dispense the carbonated water produced in the mixing passage at a predetermined pressure is disposed in the dispensing passage, and
the dispensing regulator is set to a pressure between the pressure of the pressing regulator and the pressure of the gas regulator.

28. The refrigerator according to claim 25, wherein a water tank configured to supply cold water into the ice maker, the dispenser, and the water tank for the carbonated water are disposed in the door.

29. The refrigerator according to claim 25, wherein an exhaust valve is disposed in the water tank for the carbonated water and wherein the exhaust valve opens and closes to communicate with external air, and is opened when the water is supplied, or the carbonated water is dispensed.

30. The refrigerator according to claim 25, wherein the apparatus for producing the carbonated water is accommodated in a recessed space of a door liner defining an inner surface of the door and disposed under the ice making chamber.

31. The refrigerator according to claim 30, wherein the space communicates with the refrigerating compartment.

32. The refrigerator according to claim 27, wherein one nozzle is connected to the dispenser to selectively dispense the cold water and the carbonated water.

33. The refrigerator according to claim 27, wherein nozzles for respectively dispensing the cold water and the carbonated water are disposed in the dispenser.

* * * * *